(12) United States Patent
Radloff

(10) Patent No.: US 9,723,363 B2
(45) Date of Patent: *Aug. 1, 2017

(54) SYSTEMS AND METHODS FOR ALERTING USERS OF THE POSTPONED RECORDING OF PROGRAMS

(71) Applicant: Rovi Guides, Inc., Santa Clara, CA (US)

(72) Inventor: Jon P. Radloff, Castle Rock, CO (US)

(73) Assignee: Rovi Guides, Inc., San Carlos, CA (US)

(*) Notice: Subject to any disclaimer, the term of this patent is extended or adjusted under 35 U.S.C. 154(b) by 198 days.

This patent is subject to a terminal disclaimer.

(21) Appl. No.: 14/665,902

(22) Filed: Mar. 23, 2015

(65) Prior Publication Data

US 2015/0264436 A1 Sep. 17, 2015

Related U.S. Application Data

(63) Continuation of application No. 12/129,140, filed on May 29, 2008, now Pat. No. 8,989,561.

(51) Int. Cl.
| | |
|---|---|
| *H04N 5/76* | (2006.01) |
| *H04N 21/458* | (2011.01) |
| *H04N 5/765* | (2006.01) |
| *H04N 5/782* | (2006.01) |
| *H04N 21/466* | (2011.01) |

(Continued)

(52) U.S. Cl.
CPC ........... *H04N 21/4583* (2013.01); *H04N 5/76* (2013.01); *H04N 5/765* (2013.01); *H04N 5/782* (2013.01); *H04N 21/4667* (2013.01); *H04N 21/47214* (2013.01); *H04N 21/482* (2013.01); *H04N 21/4828* (2013.01); *H04N 21/4821* (2013.01); *H04N 21/4823* (2013.01); *H04N 21/4825* (2013.01); *H04N 21/4826* (2013.01)

(58) Field of Classification Search
CPC .... H04N 5/76; H04N 21/482; H04N 21/4821; H04N 21/4823; H04N 21/4825; H04N 21/4826
USPC .......... 725/55, 58, 61, 86; 386/46, 291, 292, 386/293, 296, 297, 298
See application file for complete search history.

(56) References Cited

U.S. PATENT DOCUMENTS

| | | | |
|---|---|---|---|
| 3,594,778 | A | 7/1971 | Herald et al. |
| 3,848,193 | A | 11/1974 | Martin et al. |

(Continued)

FOREIGN PATENT DOCUMENTS

| | | |
|---|---|---|
| CA | 1217269 A1 | 1/1987 |
| DE | 29 18 846 | 11/1980 |

(Continued)

OTHER PUBLICATIONS

A New Face for Spreadsheets. PC Magazine, Dec. 22, 1987.

(Continued)

*Primary Examiner* — Jayesh Jhaveri
(74) *Attorney, Agent, or Firm* — Ropes & Gray LLP

(57) ABSTRACT

Systems and methods are provided herein in relation to notifications about alternative viewing opportunities for recording and playback of media programs. In particular, the systems and methods provide users with information related to alternative recorded programming viewing opportunities for programs scheduled for recording by a user.

12 Claims, 15 Drawing Sheets

(51) Int. Cl.
*H04N 21/472* (2011.01)
*H04N 21/482* (2011.01)

(56) References Cited

U.S. PATENT DOCUMENTS

| | | | |
|---|---|---|---|
| 3,893,049 A | 7/1975 | Bray |
| 3,956,745 A | 5/1976 | Ellis |
| 4,162,513 A | 7/1979 | Beyers, Jr. et al. |
| 4,224,644 A | 9/1980 | Lewis et al. |
| 4,264,924 A | 4/1981 | Freeman |
| 4,264,925 A | 4/1981 | Freeman et al. |
| 4,288,809 A | 9/1981 | Yabe |
| 4,325,081 A | 4/1982 | Abe et al. |
| 4,338,644 A | 7/1982 | Staar |
| 4,339,798 A | 7/1982 | Hedges et al. |
| 4,347,498 A | 8/1982 | Lee et al. |
| 4,422,105 A | 12/1983 | Rodesch et al. |
| 4,425,579 A | 1/1984 | Merrell |
| 4,429,385 A | 1/1984 | Cichelli et al. |
| 4,488,179 A | 12/1984 | Kru/ ger et al. |
| 4,495,654 A | 1/1985 | Deiss |
| 4,496,171 A | 1/1985 | Cherry |
| 4,535,333 A | 8/1985 | Twardowski |
| 4,573,072 A | 2/1986 | Freeman |
| 4,602,279 A | 7/1986 | Freeman |
| 4,620,229 A | 10/1986 | Amano et al. |
| 4,626,848 A | 12/1986 | Ehlers |
| 4,641,205 A | 2/1987 | Beyers, Jr. |
| 4,691,351 A | 9/1987 | Hayashi et al. |
| 4,701,794 A | 10/1987 | Froling et al. |
| 4,706,121 A | 11/1987 | Young |
| 4,739,406 A | 4/1988 | Morton et al. |
| 4,751,578 A | 6/1988 | Reiter et al. |
| 4,789,962 A | 12/1988 | Berry et al. |
| 4,807,052 A | 2/1989 | Amano et al. |
| 4,809,325 A | 2/1989 | Hayashi et al. |
| 4,812,940 A | 3/1989 | Takenaga |
| 4,847,696 A | 7/1989 | Matsumoto et al. |
| 4,847,698 A | 7/1989 | Freeman |
| 4,847,700 A | 7/1989 | Freeman |
| 4,855,833 A | 8/1989 | Kageyama et al. |
| 4,873,584 A | 10/1989 | Hashimoto |
| 4,879,611 A | 11/1989 | Fukui et al. |
| 4,885,775 A | 12/1989 | Lucas |
| 4,907,079 A | 3/1990 | Turner et al. |
| 4,908,707 A | 3/1990 | Kinghorn |
| 4,908,713 A | 3/1990 | Levine |
| 4,945,563 A | 7/1990 | Horton et al. |
| 4,977,455 A | 12/1990 | Young |
| 4,989,104 A | 1/1991 | Schulein et al. |
| 5,012,409 A | 4/1991 | Fletcher et al. |
| 5,027,400 A | 6/1991 | Baji et al. |
| 5,038,211 A | 8/1991 | Hallenbeck |
| 5,047,867 A | 9/1991 | Strubbe et al. |
| 5,068,733 A | 11/1991 | Bennett |
| 5,151,789 A | 9/1992 | Young |
| 5,172,111 A | 12/1992 | Olivo, Jr. |
| 5,187,589 A | 2/1993 | Kono et al. |
| 5,195,134 A | 3/1993 | Inoue et al. |
| 5,210,611 A | 5/1993 | Yee et al. |
| 5,223,924 A | 6/1993 | Strubbe |
| 5,231,493 A | 7/1993 | Apitz |
| RE34,340 E | 8/1993 | Freeman |
| 5,241,428 A | 8/1993 | Goldwasser et al. |
| 5,253,066 A | 10/1993 | Vogel |
| 5,285,284 A | 2/1994 | Takashima et al. |
| 5,296,931 A | 3/1994 | Na et al. |
| 5,323,234 A | 6/1994 | Kawasaki |
| 5,335,277 A | 8/1994 | Harvey et al. |
| 5,353,121 A | 10/1994 | Young et al. |
| 5,371,551 A | 12/1994 | Logan et al. |
| 5,410,344 A | 4/1995 | Graves et al. |
| 5,412,720 A | 5/1995 | Hoarty |
| 5,416,508 A | 5/1995 | Sakuma et al. |
| 5,459,522 A | 10/1995 | Pint |
| 5,469,206 A | 11/1995 | Strubbe et al. |
| 5,479,266 A | 12/1995 | Young et al. |
| 5,479,268 A | 12/1995 | Young et al. |
| 5,479,302 A | 12/1995 | Haines |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,508,815 A | 4/1996 | Levine |
| 5,523,796 A | 6/1996 | Marshall et al. |
| 5,528,304 A | 6/1996 | Cherrick et al. |
| 5,530,684 A | 6/1996 | Kataoka et al. |
| 5,532,754 A | 7/1996 | Young et al. |
| 5,534,911 A | 7/1996 | Levitan |
| 5,537,141 A | 7/1996 | Harper et al. |
| 5,539,822 A | 7/1996 | Lett |
| 5,550,576 A | 8/1996 | Klosterman |
| 5,552,833 A | 9/1996 | Henmi et al. |
| 5,559,548 A | 9/1996 | Davis et al. |
| 5,559,549 A | 9/1996 | Hendricks et al. |
| 5,568,272 A | 10/1996 | Levine |
| 5,576,755 A | 11/1996 | Davis et al. |
| 5,583,560 A | 12/1996 | Florin et al. |
| 5,583,653 A | 12/1996 | Timmermans |
| 5,585,838 A | 12/1996 | Lawler et al. |
| 5,585,858 A | 12/1996 | Harper et al. |
| 5,589,892 A | 12/1996 | Knee et al. |
| 5,592,551 A | 1/1997 | Lett et al. |
| 5,596,361 A | 1/1997 | Martinez |
| 5,598,523 A | 1/1997 | Fujita |
| 5,600,364 A | 2/1997 | Hendricks et al. |
| 5,619,274 A | 4/1997 | Roop et al. |
| 5,629,733 A | 5/1997 | Youman et al. |
| 5,631,995 A | 5/1997 | Weissensteiner et al. |
| 5,632,007 A | 5/1997 | Freeman |
| 5,657,414 A | 8/1997 | Lett et al. |
| 5,659,367 A | 8/1997 | Yuen |
| 5,684,525 A | 11/1997 | Klosterman |
| 5,694,381 A | 12/1997 | Sako |
| 5,699,107 A | 12/1997 | Lawler et al. |
| 5,721,829 A | 2/1998 | Dunn et al. |
| 5,724,091 A | 3/1998 | Freeman et al. |
| 5,727,060 A | 3/1998 | Young |
| 5,742,563 A | 4/1998 | Kataoka et al. |
| 5,758,257 A | 5/1998 | Herz et al. |
| 5,774,859 A | 6/1998 | Houser et al. |
| 5,790,198 A | 8/1998 | Roop et al. |
| 5,790,202 A | 8/1998 | Kummer et al. |
| 5,801,787 A | 9/1998 | Schein et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,812,937 A | 9/1998 | Takahisa et al. |
| 5,819,156 A | 10/1998 | Belmont |
| 5,822,530 A | 10/1998 | Brown |
| 5,828,945 A | 10/1998 | Klosterman |
| 5,838,314 A | 11/1998 | Neel et al. |
| 5,850,218 A | 12/1998 | LaJoie et al. |
| 5,859,641 A | 1/1999 | Cave |
| 5,880,768 A | 3/1999 | Lemmons et al. |
| 5,915,068 A | 6/1999 | Levine |
| 5,940,572 A | 8/1999 | Balaban et al. |
| 5,949,954 A | 9/1999 | Young et al. |
| 5,959,592 A | 9/1999 | Petruzzelli |
| 5,963,264 A | 10/1999 | Jackson |
| 5,969,748 A | 10/1999 | Casement et al. |
| 5,974,222 A | 10/1999 | Yuen et al. |
| 5,977,964 A | 11/1999 | Williams et al. |
| 5,986,650 A | 11/1999 | Ellis et al. |
| 5,987,213 A | 11/1999 | Mankovitz et al. |
| 5,995,155 A | 11/1999 | Schindler et al. |
| 6,002,394 A | 12/1999 | Schein et al. |
| 6,014,184 A | 1/2000 | Knee et al. |
| 6,038,367 A | 3/2000 | Abecassis |
| 6,057,890 A | 5/2000 | Virden et al. |
| 6,058,242 A | 5/2000 | Kim |
| 6,081,291 A | 6/2000 | Ludwig, Jr. |

(56) References Cited

U.S. PATENT DOCUMENTS

| | | | |
|---|---|---|---|
| 6,091,883 A | 7/2000 | Artigalas et al. | |
| 6,091,884 A | 7/2000 | Yuen et al. | |
| RE36,801 E | 8/2000 | Logan et al. | |
| 6,125,230 A | 9/2000 | Yaginuma | |
| 6,133,910 A | 10/2000 | Stinebruner | |
| 6,141,488 A | 10/2000 | Knudson et al. | |
| 6,154,771 A | 11/2000 | Rangan et al. | |
| 6,157,413 A | 12/2000 | Hanafee et al. | |
| 6,163,316 A | 12/2000 | Killian | |
| 6,173,112 B1 | 1/2001 | Gruse et al. | |
| 6,177,931 B1 | 1/2001 | Alexander et al. | |
| 6,185,360 B1 | 2/2001 | Inoue et al. | |
| 6,195,501 B1 | 2/2001 | Perry et al. | |
| 6,208,799 B1 * | 3/2001 | Marsh | H04N 5/44543 348/E5.007 |
| 6,233,389 B1 | 5/2001 | Barton et al. | |
| 6,275,648 B1 | 8/2001 | Knudson et al. | |
| 6,324,338 B1 | 11/2001 | Wood et al. | |
| 6,327,418 B1 | 12/2001 | Barton | |
| 6,334,022 B1 | 12/2001 | Ohba et al. | |
| 6,373,528 B1 | 4/2002 | Bennington et al. | |
| 6,388,714 B1 | 5/2002 | Schein et al. | |
| 6,430,358 B1 | 8/2002 | Yuen et al. | |
| 6,442,332 B1 | 8/2002 | Knudson et al. | |
| RE37,881 E | 10/2002 | Haines | |
| 6,473,559 B1 | 10/2002 | Knudson et al. | |
| 6,490,722 B1 | 12/2002 | Barton et al. | |
| 6,498,895 B2 | 12/2002 | Young et al. | |
| 6,505,348 B1 | 1/2003 | Knowles et al. | |
| 6,515,680 B1 | 2/2003 | Hendricks et al. | |
| 6,564,005 B1 | 5/2003 | Berstis | |
| 6,601,237 B1 | 7/2003 | Ten Kate et al. | |
| 6,681,396 B1 | 1/2004 | Bates et al. | |
| 6,701,527 B2 | 3/2004 | Schein et al. | |
| 6,744,967 B2 | 6/2004 | Kaminski et al. | |
| 6,760,538 B1 | 7/2004 | Bumgardner et al. | |
| 6,771,885 B1 | 8/2004 | Agnihotri et al. | |
| 6,771,886 B1 | 8/2004 | Mendelsohn | |
| 6,898,762 B2 * | 5/2005 | Ellis | H04H 60/31 348/E7.063 |
| 6,901,209 B1 | 5/2005 | Cooper et al. | |
| 7,017,179 B1 | 3/2006 | Asamoto et al. | |
| 7,027,716 B1 | 4/2006 | Boyle et al. | |
| 7,088,910 B2 | 8/2006 | Potrebic et al. | |
| 7,096,486 B1 | 8/2006 | Ukai et al. | |
| 7,151,886 B2 | 12/2006 | Young et al. | |
| 7,185,355 B1 | 2/2007 | Ellis et al. | |
| 7,207,056 B2 | 4/2007 | Wagner et al. | |
| 7,218,839 B2 | 5/2007 | Plourde, Jr. et al. | |
| 7,229,012 B1 | 6/2007 | Enright et al. | |
| 7,242,988 B1 | 7/2007 | Hoffberg et al. | |
| 7,765,235 B2 | 7/2010 | Day et al. | |
| 7,773,859 B1 | 8/2010 | Potrebic et al. | |
| 7,895,615 B1 | 2/2011 | Godwin | |
| 7,917,008 B1 | 3/2011 | Lee et al. | |
| 8,266,649 B2 | 9/2012 | Drazin et al. | |
| 2001/0024564 A1 | 9/2001 | Young et al. | |
| 2001/0028782 A1 | 10/2001 | Ohno et al. | |
| 2002/0059599 A1 | 5/2002 | Schein et al. | |
| 2002/0081096 A1 | 6/2002 | Watanabe et al. | |
| 2002/0144279 A1 | 10/2002 | Zhou | |
| 2002/0147977 A1 | 10/2002 | Hammett et al. | |
| 2002/0154888 A1 | 10/2002 | Allen et al. | |
| 2002/0174430 A1 | 11/2002 | Ellis et al. | |
| 2002/0174433 A1 | 11/2002 | Baumgartner et al. | |
| 2002/0191954 A1 | 12/2002 | Beach et al. | |
| 2002/0199185 A1 | 12/2002 | Kaminski et al. | |
| 2003/0009766 A1 * | 1/2003 | Marolda | H04N 5/76 725/97 |
| 2003/0098891 A1 | 5/2003 | Molander | |
| 2003/0103088 A1 | 6/2003 | Dresti et al. | |
| 2003/0117445 A1 | 6/2003 | Hendricks et al. | |
| 2003/0118323 A1 | 6/2003 | Ismail et al. | |
| 2003/0126607 A1 | 7/2003 | Phillips et al. | |
| 2003/0149988 A1 | 8/2003 | Ellis et al. | |
| 2003/0159147 A1 | 8/2003 | Young et al. | |
| 2003/0198461 A1 | 10/2003 | Taylor et al. | |
| 2003/0198462 A1 | 10/2003 | Bumgardner et al. | |
| 2003/0206719 A1 | 11/2003 | Bumgardner et al. | |
| 2003/0210898 A1 | 11/2003 | Juen et al. | |
| 2004/0013409 A1 | 1/2004 | Beach et al. | |
| 2004/0049794 A1 | 3/2004 | Shao et al. | |
| 2004/0060063 A1 | 3/2004 | Russ et al. | |
| 2004/0103434 A1 | 5/2004 | Ellis | |
| 2004/0151474 A1 | 8/2004 | Suh | |
| 2004/0156614 A1 | 8/2004 | Bumgardner et al. | |
| 2004/0210932 A1 | 10/2004 | Mori et al. | |
| 2004/0213557 A1 | 10/2004 | Krakirian et al. | |
| 2005/0039219 A1 | 2/2005 | Cooper et al. | |
| 2005/0047752 A1 | 3/2005 | Wood et al. | |
| 2005/0071882 A1 | 3/2005 | Rodriguez et al. | |
| 2005/0204388 A1 | 9/2005 | Knudson et al. | |
| 2005/0235323 A1 | 10/2005 | Ellis et al. | |
| 2005/0240968 A1 | 10/2005 | Knudson et al. | |
| 2005/0251828 A1 | 11/2005 | Young et al. | |
| 2005/0273819 A1 | 12/2005 | Knudson et al. | |
| 2006/0140584 A1 | 6/2006 | Ellis et al. | |
| 2007/0071399 A1 | 3/2007 | Ellis | |
| 2007/0154163 A1 * | 7/2007 | Cordray | H04N 21/6187 386/278 |
| 2007/0174336 A1 | 7/2007 | Day et al. | |
| 2007/0230903 A1 | 10/2007 | Sakatani et al. | |
| 2007/0300263 A1 | 12/2007 | Barton et al. | |
| 2008/0152315 A1 * | 6/2008 | Peters | H04N 5/775 386/291 |
| 2009/0119715 A1 * | 5/2009 | Schwesinger | H04N 5/44543 725/58 |
| 2009/0293089 A1 * | 11/2009 | Taylor | H04N 5/44543 725/53 |
| 2010/0031193 A1 * | 2/2010 | Stark | G06F 17/30861 715/810 |
| 2012/0224834 A1 * | 9/2012 | Chen | H04N 5/765 386/293 |
| 2015/0256878 A1 * | 9/2015 | Nguyen | H04N 5/76 386/292 |

FOREIGN PATENT DOCUMENTS

| | | |
|---|---|---|
| DE | 3337204 | 4/1985 |
| DE | 3623924 | 2/1988 |
| DE | 3921847 | 1/1991 |
| DE | 4240187 A1 | 6/1994 |
| EP | 0051228 | 5/1982 |
| EP | 0191149 A1 | 8/1986 |
| EP | 0 300 562 A1 | 1/1989 |
| EP | 0337336 A2 | 10/1989 |
| EP | 0339675 | 11/1989 |
| EP | 0363653 A2 | 4/1990 |
| EP | 0393955 A1 | 10/1990 |
| EP | 0444496 | 9/1991 |
| EP | 0488379 | 6/1992 |
| EP | 0 682 452 A2 | 11/1995 |
| EP | 0753964 | 1/1997 |
| EP | 0762756 A2 | 3/1997 |
| EP | 0 836 320 | 4/1998 |
| EP | 0 854645 | 7/1998 |
| EP | 0 940 983 | 9/1999 |
| GB | 2062424 A | 5/1981 |
| GB | 2155713 | 9/1985 |
| GB | 2185670 A | 7/1987 |
| GB | 2 210 526 | 6/1989 |
| GB | 2217144 A | 10/1989 |
| GB | 2 227 622 | 8/1990 |
| GB | 2 229 595 | 9/1990 |
| GB | 2 346 251 | 8/2000 |
| JP | 58210776 A | 12/1983 |
| JP | 60171685 A | 9/1985 |
| JP | 63-59075 | 8/1986 |
| JP | 62008389 A | 1/1987 |
| JP | 6260377 | 3/1987 |
| JP | 62066493 A | 3/1987 |
| JP | 62-082325 A | 4/1987 |
| JP | 62125077 A | 6/1987 |

(56) References Cited

FOREIGN PATENT DOCUMENTS

| | | |
|---|---|---|
| JP | 6354884 | 3/1988 |
| JP | 62-124293 | 5/1988 |
| JP | 63-113662 A | 5/1988 |
| JP | 63-113663 A | 5/1988 |
| JP | 63-113664 A | 5/1988 |
| JP | 63276069 A | 11/1988 |
| JP | 01-13646 | 5/1989 |
| JP | 01-120978 A | 5/1989 |
| JP | 01-015098 | 6/1989 |
| JP | 01-166678 A | 6/1989 |
| JP | 1142918 A | 6/1989 |
| JP | 01-184691 A | 7/1989 |
| JP | 01209399 A | 8/1989 |
| JP | 01-306962 A | 12/1989 |
| JP | 01307944 A | 12/1989 |
| JP | 2-56791 | 2/1990 |
| JP | 02081385 | 3/1990 |
| JP | 2113318 A | 4/1990 |
| JP | 02-117288 A | 5/1990 |
| JP | 02-146884 A | 6/1990 |
| JP | 2189753 A | 7/1990 |
| JP | 02-288571 A | 11/1990 |
| JP | 05083688 A | 4/1993 |
| JP | 60-61935 A | 3/1994 |
| JP | 06111413 | 4/1994 |
| JP | 06303541 | 10/1994 |
| JP | 07098970 A | 4/1995 |
| JP | 08130517 A | 5/1996 |
| JP | 5-53378 | 7/1997 |
| JP | 09-270965 A | 10/1997 |
| JP | 10247344 A | 9/1998 |
| JP | 10257400 A | 9/1998 |
| JP | 2838892 | 10/1998 |
| JP | 11-136615 A | 5/1999 |
| JP | 11-313280 A | 11/1999 |
| JP | 2000-138886 | 5/2000 |
| JP | 2000-224533 | 8/2000 |
| JP | 2000-235546 | 8/2000 |
| JP | 2000-306314 | 11/2000 |
| JP | 2001-88372 | 4/2001 |
| JP | 2001-165669 | 6/2001 |
| JP | 2001-167522 | 6/2001 |
| JP | 200013708 A | 8/2001 |
| JP | 2001-257950 | 9/2001 |
| JP | 2002-24061 | 8/2002 |
| JP | 2003-199004 A | 7/2003 |
| JP | 2005-201748 A | 7/2005 |
| JP | 2005-213611 A | 8/2005 |
| JP | 1078328 | 5/2009 |
| WO | WO-8700884 A1 | 2/1987 |
| WO | WO-88/04507 | 6/1988 |
| WO | WO-89/03085 | 4/1989 |
| WO | WO-90/00847 A1 | 1/1990 |
| WO | WO-92/04801 | 3/1992 |
| WO | WO-9222983 A2 | 12/1992 |
| WO | WO-93/23957 A1 | 11/1993 |
| WO | WO-95/32587 | 11/1995 |
| WO | WO-9532583 A1 | 11/1995 |
| WO | WO-96/26605 | 8/1996 |
| WO | WO-96/31980 A1 | 10/1996 |
| WO | WO-96/36172 | 11/1996 |
| WO | WO-96/37075 | 11/1996 |
| WO | WO-96/41478 | 12/1996 |
| WO | WO-97/13368 | 4/1997 |
| WO | WO-97/48230 | 12/1997 |
| WO | WO-98/06219 | 2/1998 |
| WO | WO-98/48566 A2 | 10/1998 |
| WO | WO-99/45700 | 9/1999 |
| WO | WO-99/52279 | 10/1999 |
| WO | WO-99/66725 | 12/1999 |
| WO | WO-00/04706 A2 | 1/2000 |
| WO | WO-00/07368 | 2/2000 |
| WO | WO-00/08850 | 2/2000 |
| WO | WO-00/08851 | 2/2000 |
| WO | WO-00/08852 | 2/2000 |
| WO | WO-00/16548 | 3/2000 |
| WO | WO-00/28739 | 5/2000 |
| WO | WO-00/58833 | 10/2000 |
| WO | WO-00/58967 | 10/2000 |
| WO | WO-00/59214 A1 | 10/2000 |
| WO | WO-00/59223 | 10/2000 |
| WO | WO-00/62298 | 10/2000 |
| WO | WO-00/62299 | 10/2000 |
| WO | WO-00/62533 | 10/2000 |
| WO | WO-00/67475 | 11/2000 |
| WO | WO-01/22729 | 3/2001 |
| WO | WO-01-46843 A2 | 6/2001 |
| WO | WO-01/47238 | 6/2001 |
| WO | WO-01/47249 | 6/2001 |
| WO | WO-01/47257 | 6/2001 |
| WO | WO-01/47273 | 6/2001 |
| WO | WO-01/47279 | 6/2001 |
| WO | WO-01/76239 | 10/2001 |
| WO | WO-0176248 A2 | 10/2001 |
| WO | WO-02/078317 A2 | 10/2002 |

OTHER PUBLICATIONS

Advanced Analog Systems—Addressable Terminals, General Instrument Corp. of Horsham, Pennsylvania, (http//www.gi.com/BUSAREA/ANALOG/TERMINAL/WATCH/watch.html), printed from the internet on Mar. 4, 1999.
Blue Lagoon, Don Snider Demo Videotape on TVIS System, San Diego & Orlando Broadcast, 1983, Screen Shot (V79392).
Decision of Technical Board of Appeal 3.4.2, Jul. 13, 2004.
Decisions of the Enlarged Board of Appeal, Official Journal EPO, May 31, 2001.
DIRECTV Digital Satellite Receiver—Operating Instructions, Sony Electronics Inc. (2001).
DIRECTV Receiver—Owners Manual, Directv, Inc. (2002).
DIRECTV Receiver with TiVo Digital Satellite Receiver/Recorder SAT-T60—Installation Guide, Sony Corporation (2000).
DIRECTV Receiver with TiVo Installation Guide, Philips (2000).
DIRECTV Receiver with TiVo Viewers Guide (1999, 2000).
Edmondson et al., "NBC Switching Central," SMPTE Journal, Oct. 1976, vol. 85, No. 10, pp. 795-805.
Edwardson et al., "CEEFAX: A Proposed New Broadcasting Service," SMPTE Journal, Jan. 1974, vol. 83, pp. 14-19.
Eitz et al., "Video Text Programs Video Devices in the Home," Rundfunktechn Mitteilungen, vol. 30 (1986).
Expert Report of Dr. Gary S. Tjaden, Dec. 18, 2002.
Expert Report of Dr. Gary S. Tjaden, May 13, 2002.
Expert Report of Stephen D. Bristow with regard to validity of U.S. Pat. No. 5,568,272 and U.S. Pat. No. 5,508,815, Jun. 10, 2002.
Fall 2001 TiVo Service Update with Dual Tuner!, TiVo Inc. (2001).
Gemstar—TV Guide International, Inc., et al. v. International Trade Commission, et al., 383 F.3d 1352 (Fed. Cir. Sep. 16, 2004)).
Hoffman et al., "Videotext Programmiert Videorecorder," Sep. 1982, 9 pages.
James, A., "Oracle-Broadcasting the Written Word," Wireless World, Jul. 1973.
Philips Consumer Electronics, Users Manual, Matchline 28DC2070, 33DC2080.
PTV Recorder Setup Guide, Philips (2000).
RCA Satellite Receiver User's Guide, Thomson Multimedia Inc. (2001).
Roizen, Joseph, "Teletext in USA," Jul. 1981, pp. 602-610.
Symposium Record Broadcast Sessions, 14th International TV Symposium, Montreux, Switzerland, Jun. 6-12, 1985, 9 pages.
U.S. International Trade Commission Publication 3564. Certain Set Top Boxes and Components Thereof. Investigation No. 337-TA-454 (Nov. 2002).
User's Guide RCA Color TV with TV Plus + Guide, 1997.
Von Gerhard Eitz and Karl-Ulrich Oberlies, "Videotext Programmiert Videoheimgerate (VPV)," Sep. 1986, pp. 223-229; Translation of Eitz and Oberlies Article, 10 pages.
Ziesel et al., "An Interactive Menu-Driven Remote Control Unit for

(56) References Cited

OTHER PUBLICATIONS

TV-Receivers and VC-Recorders," IEEE Transactions on Consumer Electronics, Aug. 1988, vol. 34, No. 3, pp. 814-818.

\* cited by examiner

SYSTEMS AND METHODS FOR ALERTING USERS OF THE POSTPONED RECORDING OF PROGRAMS

CROSS-REFERENCE TO RELATED APPLICATION

This application is a continuation of U.S. patent application Ser. No. 12/129,140, filed May 29, 2008, now issued as U.S. Pat. No. 8,989,561, which is incorporated by reference in its entirety herein.

BACKGROUND OF THE INVENTION

This invention is directed to systems and methods for recording programs and more particularly, systems and methods for ensuring that users are aware of program recording times.

Recording devices, such as digital video recording (DVR) devices, are well known in the art. Often, users desire to record multiple programs that are broadcast at overlapping time periods, resulting in a recording conflict. Some programs are broadcast at multiple times within a given time frame. For example, the Comedy Central television Network may broadcast the same episode of "The Daily Show" multiple times each day. Therefore, if recording an episode of The Daily Show at a first time creates a conflict with recording a second program, the desired episode of The Daily Show may be recorded at a later time or on a future day or simply at a different time and/or day, later or earlier than the specified time. Premium movie channels, such as HBO, SHOWTIME, CINEMAX, and STARZ, likewise broadcast episodes of their weekly series multiple times a week. Information about such later transmissions is readily available enabling a recording device to postpone recording of conflicting programs.

However, current recording devices fail to effectively inform users about such postponement. More particularly, in displaying lists of recorded programs and programs scheduled for recordation, current recording devices fail to clearly inform users that recordation of a given program has been, or is currently being, postponed. This results in confusion for users attempting to view a program they expected to have been recorded at an original transmission time.

In other instances, the initial transmission of scheduled broadcasts are postponed for a variety of reasons. Sporting events may be delayed due to inclement weather. Other programs may be delayed due to sporting events or other live programs lasting longer than anticipated. For example, on Sunday evenings during football season, 60 Minutes often airs in its entirety after the preceding football game ends, even when the game does not end before 60 Minutes regularly scheduled broadcast time. Information about such delayed transmissions is not readily available, creating challenges for recording devices attempting to record such programs.

SUMMARY OF THE INVENTION

Accordingly, it is desirable to provide video recording systems and methods that are capable of rescheduling recordings to avoid conflicts and which effectively alert users of such rescheduling. In part to address this need, recording systems and methods are described herein that effectively alert users of recordation postponement, for example, by displaying "rain check" notifications in affected program listings as appropriate.

One embodiment of the invention relates to a system for recording and playing back copies of a program. The system includes a recording device and control circuitry. The control circuitry is configured to receive instructions to record a first program starting at a first time and to determine that the system is not capable of recording the first program starting at that first time. The control circuitry is further configured to display a program listings screen that includes a listing for at least the first program along with a notification to a user indicating an alternative recorded program viewing opportunity for the first program. Alternative recorded program viewing opportunities may include a pending future recording of the first program, a completed recording of the first program which started at a time other than the originally scheduled time, and a recording of the program that is available via a video-on-demand server. In alternative embodiments, the notification may more generally include an indication of an alternative viewing opportunity that may include a later transmission time, an alternative recorded viewing opportunity, or alternative content that might be of interest to a viewer instead of the first program.

In one embodiment, the notification includes an icon. In addition, or in the alternative, the notification may include text indicating a new time, different from the first time, at which the program may be recorded and/or a color with which the program is listed to distinguish the program from others in the program listings screen. The first program may be an episode in a series or other type of program, including a sporting event, movie, performance, or other form of program.

The program listings screen may be in list or grid format. For example, in one embodiment, the program listings screen is a scheduled recordings listings screen (e.g., a list of pending program recordings) or a completed or in-progress recordings listings screen (e.g., a list of programs that have already been recorded or that have started to be recorded). In one embodiment, the program listings screen may include a combination of scheduled, in progress and completed recordings. In some embodiments, the program listings screen includes a plurality of cells in a time versus channel grid of program listings. The cells correspond to programs being transmitted at various times on various channels. When a cell corresponding to the first program is displayed in the program grid, the control circuitry displays the notification in the cell.

In one embodiment, the control circuitry determines that the system is not capable of recording the first program starting at the first time in response to determining that recording the first program starting at the first time would conflict with recording a second program during the first time. The determination may further be based on program relative recording priorities, which in turn may be based on user input. In another embodiment, the control circuitry determines that the system is not capable of recording the first program starting at the first time in response to determining that the first program is no longer being transmitted starting at the first time.

In still a further embodiment, the control circuitry is configured to determine a later time at which the first program may be recorded and to subsequently record the first program at that time.

In some embodiments, recording and playing back copies of a program involves the use of an interactive media guidance application. This embodiment comprises receiving instructions to record a first program at a first time and determining that the interactive media guidance application is not capable of recording the first program starting at the first time. The method further includes displaying a program listings screen that includes at least the first program along with a notification to a user indicating an alternative recorded program viewing opportunity for the first program. In certain embodiments, the notification may more generally include an indication of an alternative viewing opportunity which may include a later transmission time, an alternative recorded viewing opportunity, or alternative content that might be of interest to a viewer instead of the first program.

BRIEF DESCRIPTION OF THE DRAWINGS

The above and other features of the present invention, its nature and various advantages will be more apparent upon consideration of the following detailed description, taken in conjunction with the accompanying drawings in which.

DESCRIPTION OF CERTAIN ILLUSTRATIVE EMBODIMENTS

To provide an overall understanding of the invention, certain illustrative embodiments will now be described. However, as would be understood by one of ordinary skill in the art, the methods described herein may be adapted and modified as is appropriate for the application being addressed, the systems and methods described herein may be employed in other suitable applications, and such other additions and modifications will not be deemed to depart from the scope herein. For example, the features disclosed herein are described primarily in relation to an interactive media guidance application. These features, however, may also be incorporated into any suitable application, such as a recording scheduling application, a gaming scheduling application, or other electronic scheduling application without departing from the scope of the invention. Such applications may be implemented wholly on a user's equipment or using a client server approach in which the server is remote from the user's equipment.

Figure 1:
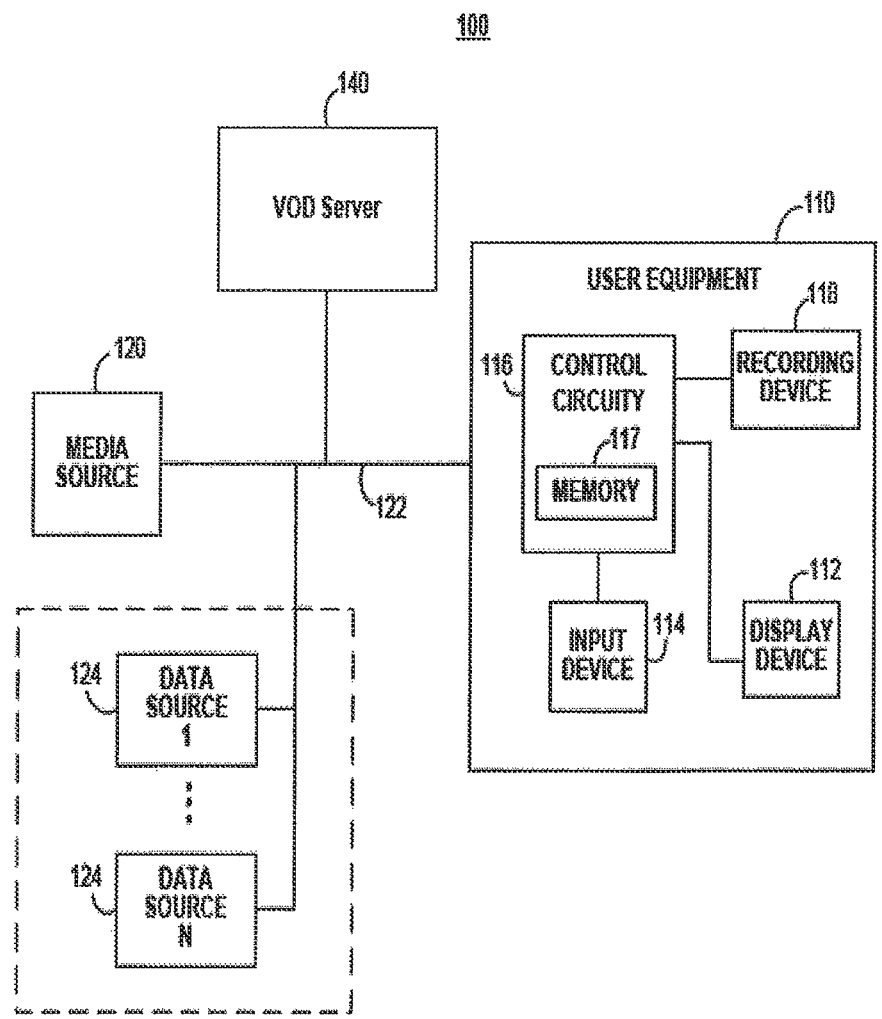
FIG. 1 is a diagram of an illustrative interactive television system in accordance with one embodiment of the present invention.

FIG. 1 shows an illustrative interactive media system 100 in accordance with one embodiment of the invention. User equipment 110 receives media in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system head end, satellite media distribution facility, media broadcast facility, internet protocol television (IPTV) head end, on-demand server (e.g., VOD server), website, game service provider (e.g., for online gaming), switched digital video (SDV) system (e.g., including a SDV manager, edge-resource manager, and edge-QAM subsystems) or any other suitable facility or system for originating or distributing media. Media source 120 may be configured to transmit signals over any suitable communications path 122 including, for example, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing requests from a trick-play client or an interactive media guidance application implemented in, for example, user equipment 110 or a VOD server.

User equipment 110 may include any equipment suitable for providing an interactive media experience. User equipment 110 may include television equipment such as a television, set-top box, recording device, video player, user input device, or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a home theatre or consumer electronic device, such as, for example, a gaming system (e.g., X-Box, PlayStation, or GameCube) or a portable consumer electronic device, such as a portable DVD player, a portable gaming device, a cellular telephone, a PDA, a music player (e.g., MP3 player), or any other suitable home theatre or portable device.

In the example of FIG. 1, user equipment 110 includes at least control circuitry 116, display device 112, and user input device 114, all of which may be implemented as separate devices or as a single device. User equipment 110 may optionally include recording device 118 which may be implemented as a separate device or as a single device. An interactive media guidance application may be implemented on user equipment 110 to provide media guidance functions to the user for media displayed on display device 112. In some embodiments, the interactive media guidance application may be or include an interactive television application, a trick-play client, or any other application for providing media features to the user.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of the trick-play client. Display device 112 may also be configured to provide for the output of audio.

User input device 114 may be any suitable device for interfacing with the interactive media guidance application. For example, user input device 114 may be a remote control, keyboard, mouse, touch pad, touch screen or voice recognition interface. User input device 114 may communicate with user equipment 110 and control circuitry 116 using any suitable communications link. For example, user input device 114 may use an infra-red (IR), radio-frequency, Bluetooth, wireless (e.g., 802.11), wired, or any other suitable communications link. The information received by user input device 114 may either be classified as a source selection command or a guidance application navigation command. A source selection command may include a channel change selection, video-on-demand selection, digital video recorder selection, or any suitable selection that causes the user to view content different than the content the user is currently viewing. The content the user is currently viewing may be defined as content that is currently being displayed on the display device 112. A guidance application navigation command may include any suitable command that allows the user to change the information displayed in the interactive media guidance application.

Control circuitry 116 is adapted to receive user inputs from input device 114 and execute the instructions of the interactive media guidance application. Control circuitry 116 may include one or more tuners (e.g., analog or digital tuners), encoders and decoders (e.g., MPEG decoders), processors (e.g., Motorola 68000 family processors, or MIPS family processors), memory 117 (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 116 may be included as part of one of the devices of user equipment 110 such as, for example, part of display 112 or any other device (e.g., a set-top box, television and video player). Control circuitry 116 may also include advertisement selection circuitry to prevent the user from experiencing an episodic advertisement out of order. In some embodiments, memory 117 may store user viewing data that includes a user's history of viewing advertisements.

In some embodiments, control circuitry 116 may include a processor (e.g., a microcontroller or microprocessor) that receives and executes interactive media guidance application instructions. These instructions may perform various determinations to ensure that the user is not presented an advertisement of an episodic advertisement out of the correct order. Control circuitry 116 may include memory such as random-access memory for use when executing applications. Nonvolatile memory may also be used to store a boot-up routine or other instructions. In other embodiments, interactive media guidance application instructions may be executed in other suitable stand alone hardware.

Recording device 118 may be a personal video recorder (PVR), digital video recorder (DVR), video cassette recorder (VCR), DVD-recorder, compact disc recorder, or any other suitable recording device or storage device. In some embodiments, recording device 118 may be a storage device for storing or recording content or data recorded or provided by other components of interactive media system 100 (e.g., a storage device for caching live television programs to enable trick play functions). Recording device 118 may include one or more tuners, and may be configured to cache media as the user receives it with user equipment 110 (e.g., cache the currently tuned channel) to provide trick-play functions for the user. In some embodiments, recording device 118 may include circuitry to determine which advertisements should be recorded using recording device 118.

A hard disk and other storage in recording device 118 may be used to support databases (e.g., a database of media guidance information for recorded programs, or a database of advertisement information for recorded or cached advertisements). A hard disk or other storage in recording device 118 may also be used to record media such as television programs or video-on-demand content or other content provided to recording device 118.

In some embodiments, recording device 118 may include IR communications circuitry or other suitable communications circuitry for communicating with a remote control (e.g., with user input device 114). Recording device 118 may also include dedicated buttons and a front-panel display. The front-panel display may, for example, be used to display the current channel to which the recording device is tuned.

In some embodiments, recording device 118 may be a network recording device that is located outside of user equipment 110. In some embodiments, the network recording device may be incorporated in content source 120 (e.g., at the head-end of a cable plant), data source 124, VOD server 140, user equipment 110 (e.g., as a second recording device, or a hard drive on a home computer), an Internet server (not shown), or any other suitable device. In some embodiments, the network recording device may be a stand alone device (e.g., a commercial network recording device, or a DVR device in a home or neighborhood network). The network recording device may receive instructions to perform recordings from the interactive media guidance application implemented on any of a plurality of instances of user equipment 110.

In some embodiments, the interactive media guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120, data sources 124, and/or video-on-demand server 140. A single user may also have multiple instances of user equipment 110. But for the clarity of the figure, the equipment of only a single user is shown. The equipment of the plurality of users may be connected to media source 120, data sources 124 and advertisement generator 140 using a cable television network, a satellite television network, a local area network (LAN), a wireless network, the Internet (e.g., using a DOCSIS modem), or any other suitable means. In some embodiments, the equipment of the plurality of users may be connected to each other using any suitable means.

User equipment 110 may receive interactive media guidance application data from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive media guidance application. Another data source 124 may, for example, provide data for another interactive application (e.g., a home shopping application, and real-time data such as sports scores, stock quotes, news data and weather data). In some embodiments, data sources 124 may provide data to the interactive media guidance application using a client/server approach. There may be one server per data source, one for all sources or, in some embodiments, a single server may communicate as a proxy between user equipment 110 and various data sources 124. In such embodiments, data source 124 may include control circuitry for executing the instructions of the online media guidance application. Data source 124 may provide guide data to the interactive media guidance application. In one embodiment, the guide data provided by data source 124 may be periodically downloaded in part (e.g., updated) or in whole to memory 117 of control circuitry 116. The guide data may include program listings, or any other suitable guide data. In another embodiment, the data source 124 providing guide data provides real-time or near real-time schedule updates, including for example, updates to program start times and end times as may result from unscheduled program delays, including for example, and without limitation, rain delays for sporting events, a sporting event running longer than its scheduled air time, or unscheduled news conferences delaying a program start time. The real-time or near real-time data can be communicated according to a push or pull paradigm, using for example, a web service.

In some embodiments, interactive media system 100 may also include video-on-demand (VOD) server 140. FIG. 1 shows media source 120, data sources 124, and VOD server 140 as separate elements. In practice, their functionality may be combined and provided from a single system at a single facility, or multiple systems at multiple facilities. For example, a separate data source 124 may be associated with each of a plurality of television broadcasters and may provide data that is specific to those broadcasters (e.g., advertisements for future programming of the broadcasters, or logo data for displaying broadcasters' logos in interactive media guidance application display screens).

Figure 2A:
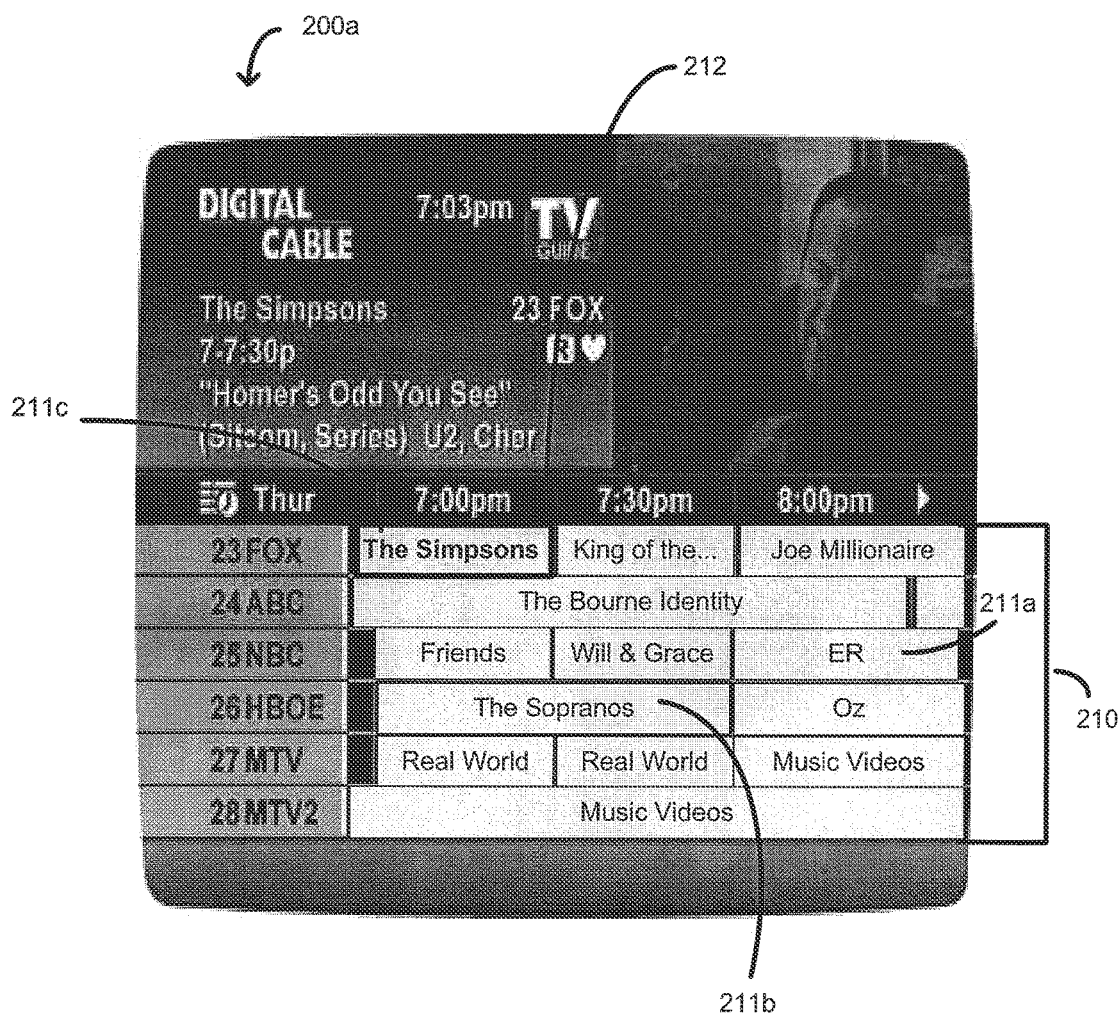
FIGS. 2A-2C show illustrative display screens showing television program listings in accordance with one embodiment of the present invention.
Figure 2B:
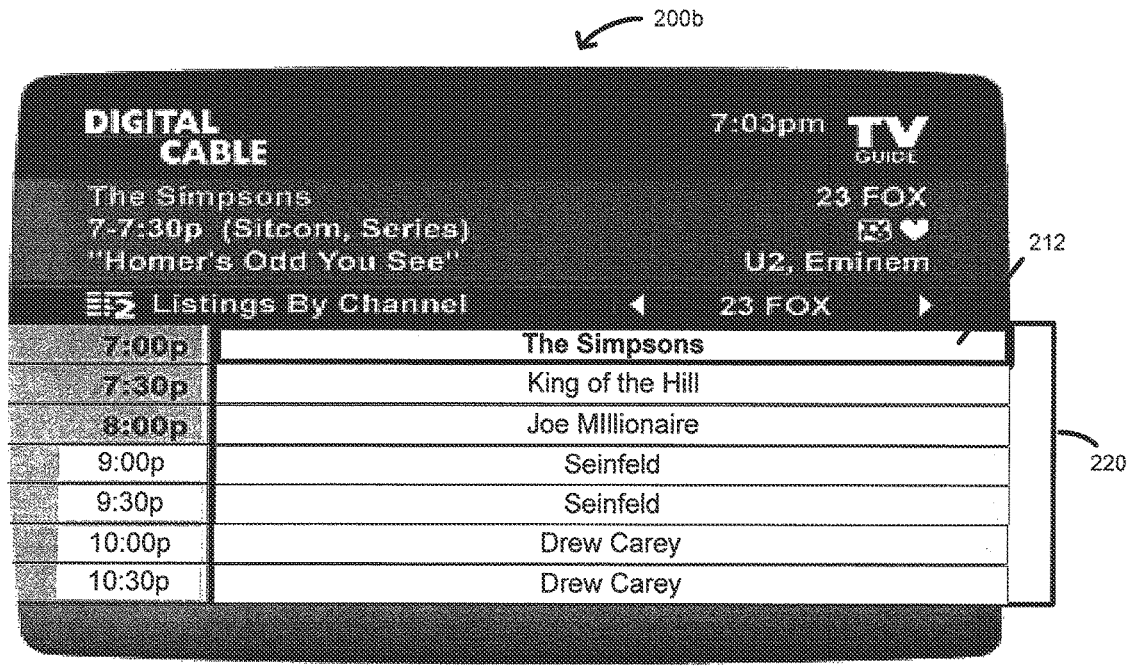
Figure 2C:
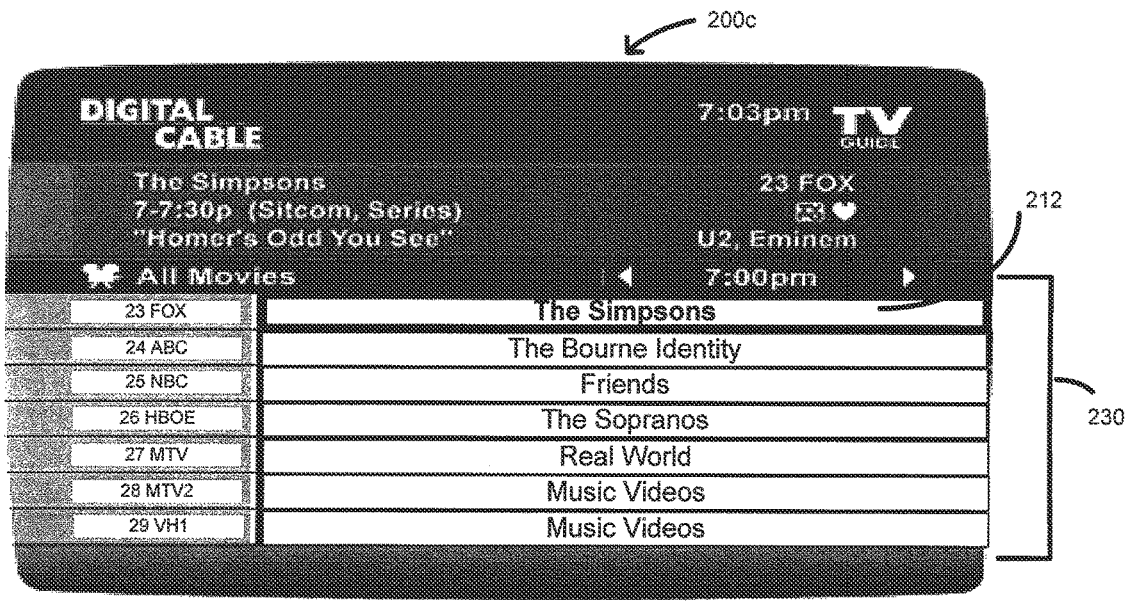

FIGS. 2A-2C show illustrative program guide screens 200a, 200b, and 200c that the interactive media guidance application may display on display device 112. The user may access program guide screens 200a-200c by any suitable means such as, for example, pressing a "menu," "guide," or other suitable key or key sequence on user input device 114, navigating from another program guide screen or menu, or by any other suitable means.

Illustrative program guide screen 200a, depicted in FIG. 2A contains a channel versus time grid 210 of program listings which includes program titles, channels, scheduled broadcast times, and other suitable program information from memory 117 of FIG. 1. The rows and columns of the grid 210 intersect to form cells 211 (e.g., cells 211a-211c) corresponding to programs airing on multiple channels at multiple times. The programs are listed according to their normally scheduled airtime. For example, cell 211a corresponds to "ER", normally scheduled to air at 8:00 pm on NBC. Cell 211b corresponds to "The Sopranos", normally scheduled to air at 7:00 pm on HBOE. Cell 211c corresponds to "The Simpsons", normally scheduled to air at 7:00 pm on FOX.

As illustrated in FIGS. 2B and 2C, in other embodiments, the program guide screen may include a list 220 or 230 (i.e., a single column) of programs. List 220 presents multiple programs on a single channel for multiple time periods. List 230 presents multiple programs airing at a single time for multiple channels. In the grid 210 or either list 220 or 230, the user may select a desired program listing with highlight region 212 using user input 116, or any other suitable means.

To schedule the recording of a program or other suitable video, a user may highlight a desired program (in the example grid 210 of FIG. 2A, cell 211c corresponding to "The Simpsons" is highlighted), and press a "Record" key or key sequence, or select a "Record" icon from the screen using user input device 114. In response, the interactive media guidance application may direct recording device 118 to record the program. This may be indicated, for example, by the control circuitry 116 displaying a recording icon (see, for example, recording icon 406 of FIG. 4, described further below), by the listing for the program in the corresponding grid cell.

Figure 3:
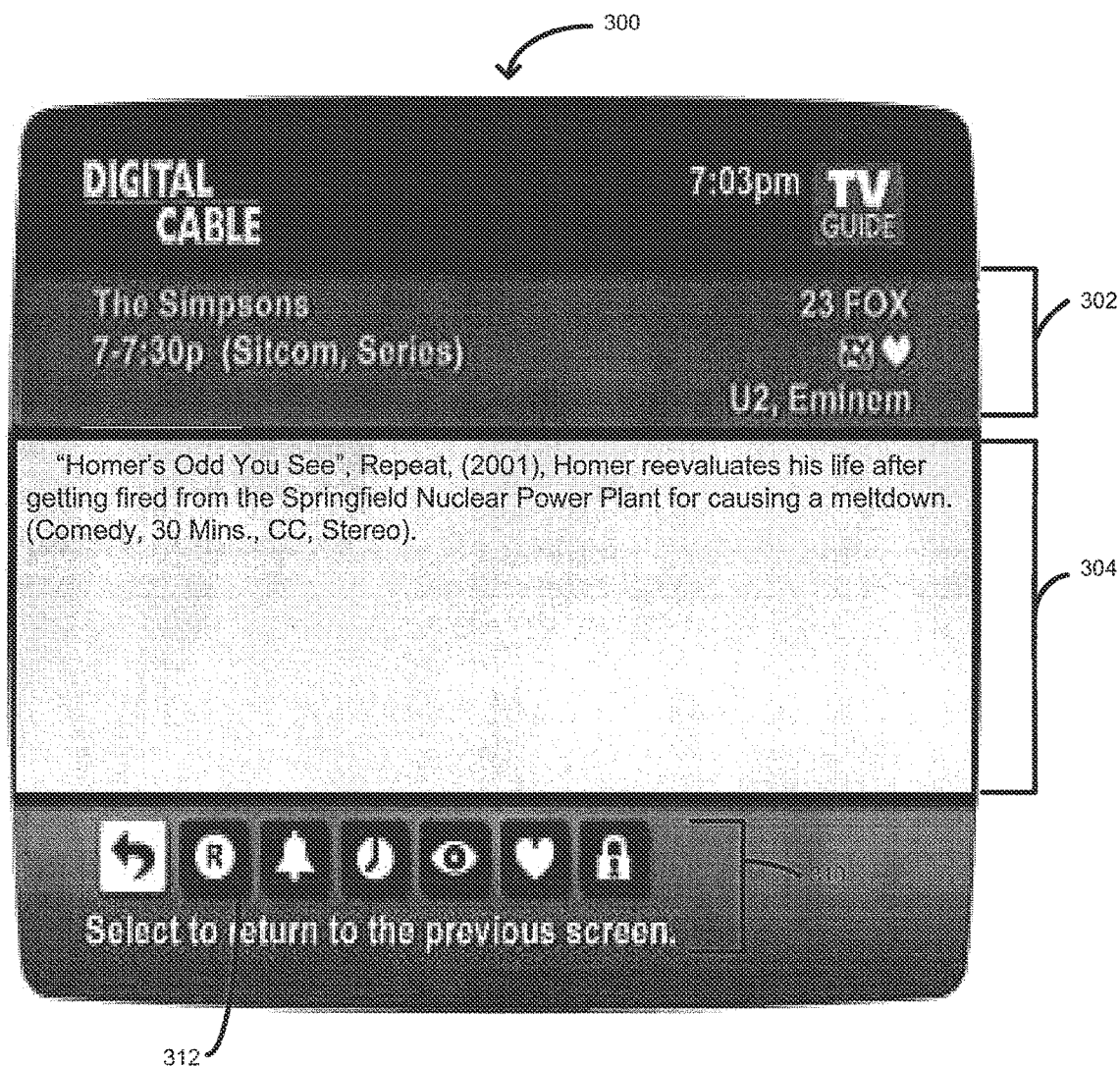
FIG. 3 shows an illustrative display screen showing information relating to a television program in accordance with one embodiment of the present invention.

Prior to choosing to record a program, the user may request additional information regarding the program. For example, a user may highlight a listing using highlight region 212 and press an "Information" key or key sequence on user input device 114. In response to receiving the user request, the interactive media guidance application may display an information screen. FIG. 3 shows an illustrative information screen 300, which includes detailed information section 302, and program description area 304 (including the program title, time and channel). In alternative embodiments, the information screen 300 also includes a video window.

Screen 300 also includes selectable icons 310, some or all of which may include text descriptions upon being highlighted by the user. The screen may include icons for recording of programs, series recording, parental control locks, or any other suitable interactive media guidance application action. If a user determines that he wants to record the program, the user may schedule the recording by pressing a "Record" key or key sequence, selecting a "Record" icon 312 from the screen using user input device 114, or by any other suitable means.

In some embodiments, the user may be watching a program on display device 112 in a full screen view and decide to record the program. To record the program, the user may press a "Record" key or key sequence on user input device 114, or use any other suitable means. A pop-up notice may appear to confirm that recording has begun. The interactive media guidance application may also display the notice in response to receiving a user confirmation to record the program. In some embodiments, the interactive media guidance application may direct pop-up notice to appear automatically when a previously-scheduled recording commences.

Figure 4:
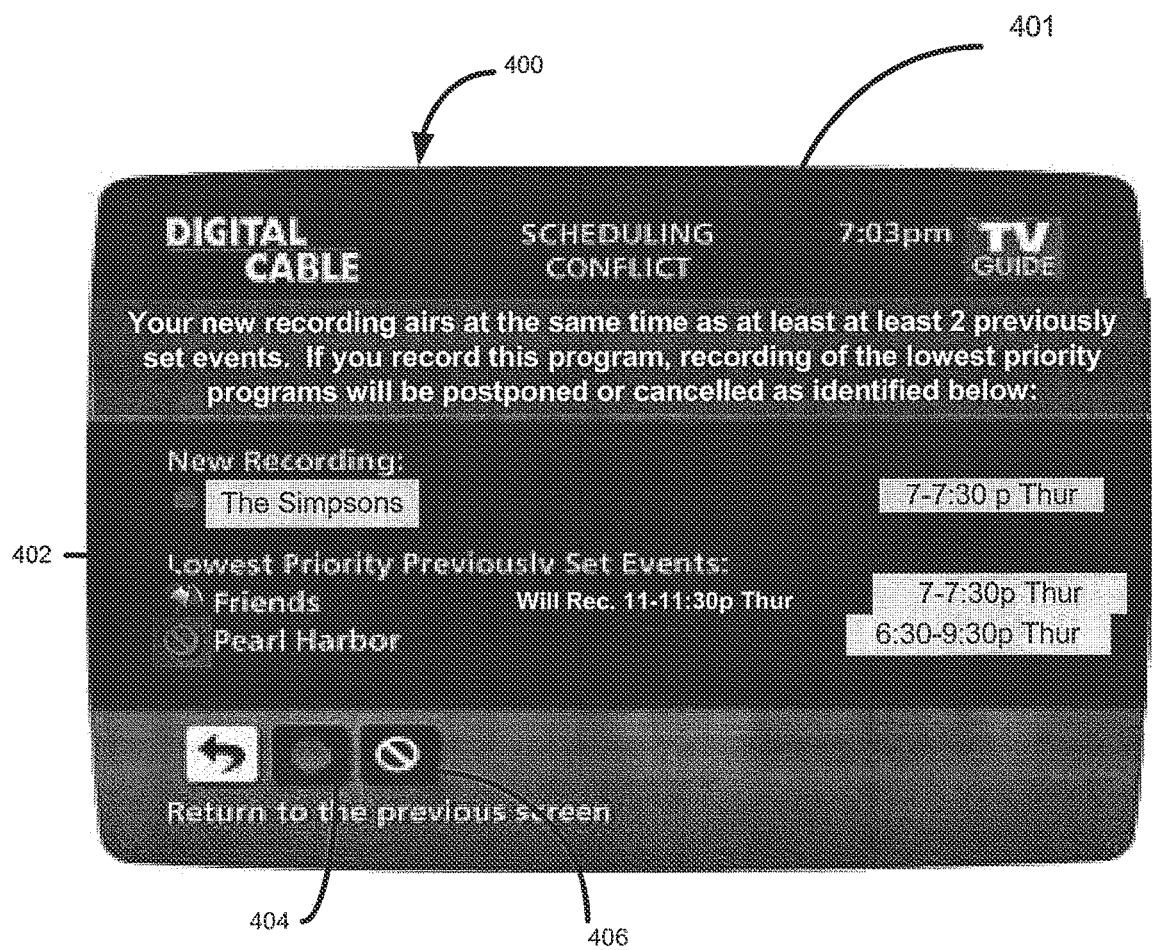
FIG. 4 shows an illustrative display screen showing a scheduling conflict notice in accordance with one embodiment of the present invention.

In some instances, the interactive media guidance application determines that the user equipment 110 does not have enough available tuners to record all of the programs a user has requested to be recorded at a given time, resulting in a recording conflict. FIG. 4 depicts a screen 400 of a scheduling conflict notice 401 displayed when a user requests a new program to be recorded and the user equipment 110 detects a conflict. The notice 401 provides an indication of how other programs scheduled to be recorded will be treated in response to requesting the new recording. For example, other scheduled recordings may be cancelled or postponed.

In the illustrative conflict notice 401, the user has just selected to record "Simpsons", which conflicts with at least the recording of two other programs, "Friends" and "Pearl Harbor". In response to detecting a conflict, the interactive media guidance application determines a conflict resolution. The conflict resolution includes decisions as to which programs to record at the user-selected time, which programs to record at a later time or date, and which programs to cancel recording. The conflict resolution can be determined based on a number of factors, including priorities assigned by the user to each of the scheduled recordings, the existence of re-transmissions of the conflicting scheduled recordings, the quality of the available re-transmissions (for example, whether re-airings are available in high-definition), intended viewing time frames (described further below), or other parameters set by the user or determined automatically by the interactive media guidance application. Ties may be broken randomly or based on some other arbitrary selection criteria.

In resolving the conflict that resulted in the display of the conflict notice 401, the interactive media guidance application determined to cancel the recording of Pearl Harbor and to postpone the recording of "Friends" to a later time. The interactive media guidance application determined that the episode of "Friends" that conflicted with the recording of "The Simpsons" and "Pearl Harbor" was being rebroadcast on the same channel at 11-11:30 pm later that evening and that a tuner was available to record the episode at that time. The postponement of the recording is indicated to the user in two ways. First, a "rain check" icon 402 is displayed beside the program in the notice 401. Second, the notice 401 indicates the time at which the recording will take place. Upon viewing the notice 401, the user can select to confirm the recording of the newly selected program by selecting the record icon 404 using the input device 114. Alternatively, the user can cancel the new recording request by selecting the cancel icon 406 using the input device 114, or by other suitable means.

In the notice 401, the rain check icon 402 is displayed as an umbrella. In other implementations, the rain check icon may be displayed as a rain drop, a rain cloud, the words "rain check" or "postponed", or abbreviations thereof, surrounded by a geometric shape such as an oval, rectangle, or other suitable oblong shape.

To place a limit on how far in the future to look for additional transmissions, the interactive media guidance application may determine when the user will likely view the program. This determination may be made automatically (e.g., based on the user viewing history) or in response to a user indication. Once the interactive media guidance application determines a time frame in which the user intends on viewing the program, it may limit the search for all other transmissions of the program to those that are within that time frame.

Figure 5:
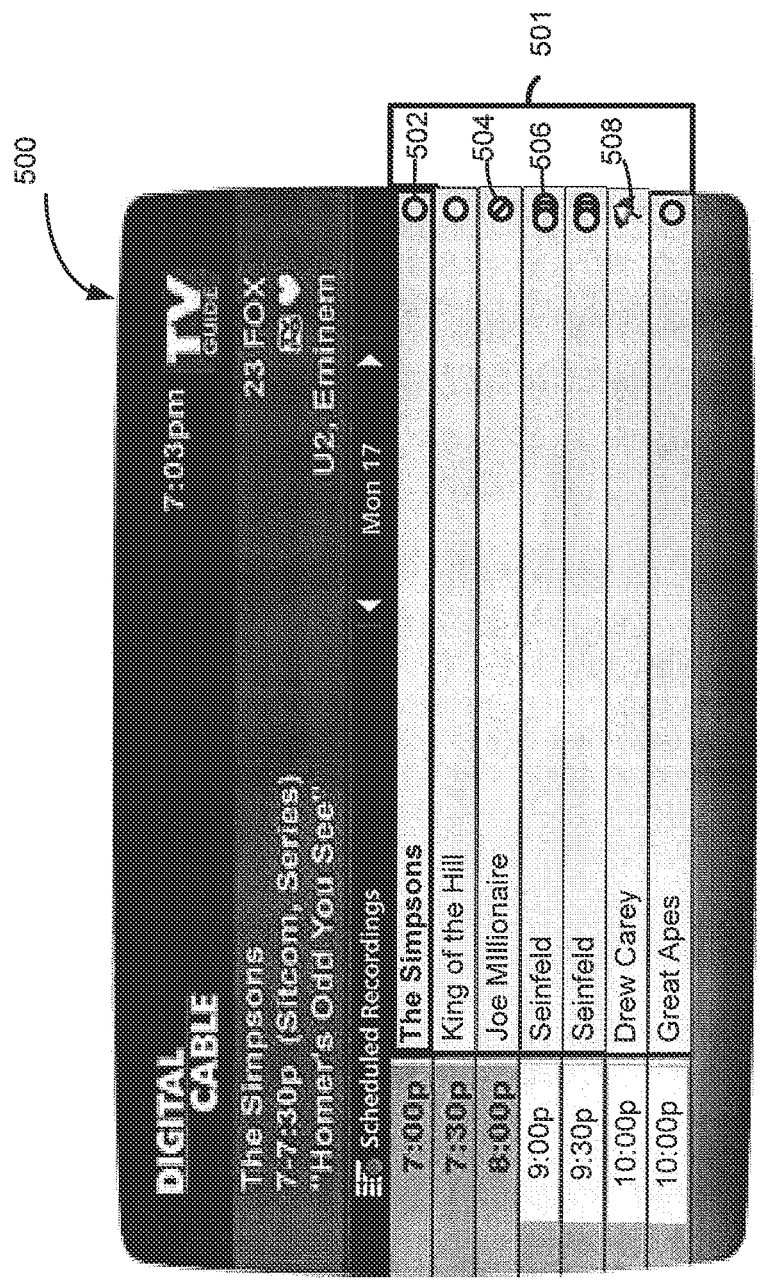
FIGS. 5 and 6 show illustrative display screens showing lists of programs scheduled for recording in accordance with one embodiment of the present invention.

After a user has scheduled one or more recordings, the user may access a "Scheduled Recordings" listings screen that displays at least a subset of the programs that the user requested to have recorded. FIG. 5 is a screen 500 including an illustrative Scheduled Recordings listings screen 501. The user may access the Scheduled Recordings listings screen 501 by pressing a "Scheduled Recordings Menu" key or key sequence, navigating from one of the interactive media guidance application screens, or by any other suitable means.

The Scheduled Recordings listings screen 501 lists programs requested to be recorded on a given day. If more programs are requested to be recorded than can fit on a single screen, the user can navigate to view additional requested recordings by pressing a "page down" key, navigating using cursor keys to the bottom of a displayed list, or other suitable means. Users can navigate to view recordings requested to be scheduled on other days by pressing, for example, "right" or "left" navigation buttons, "day forward" or "day back" navigation buttons on the user device 114, or by other suitable means. Users may obtain additional information about a particular listed program by navigating to the program and pressing an "ok", "select", or "information" button. Upon navigating to a program, basic information, such as title, channel, rating, and time, about the program is displayed on the screen 500 about the Scheduled Recordings listings screen 501.

In one embodiment, programs listed in the Scheduled Recordings listings screen 501 preferably remain in the listings screen until such programs are recorded. In another embodiment, the programs remain on the listings screen until their respective end times have passed.

Within the Scheduled Recordings listings screen 501, an icon is displayed next to each program requested to be recorded to indicate its recording status. For example, One-Time Recording icon 502, displayed next to "The Simpsons" indicates that the recording request is a one-time recordation request, and that the interactive media guidance application will record the program at the originally scheduled transmission time. Cancelled One-Time Recording Icon 504 indicates that the user had requested the program to be recorded on a one-time basis, but that the recording has been canceled. For example, the recording may have been canceled due to a conflict that could not be resolved by postponing the program in question. Series Recording icon 506 indicates the program corresponds to an episode of a series that the user has requested to record some or all episodes of, and that the interactive television program will record the program at the originally schedule transmission time. Rain Check icon 508 indicates, as described above, that the program will be recorded at a later time.

This later transmission time may not occur until several days after the original transmission time. In such cases, had the interactive media guidance application not displayed the postponed program in the Scheduled Recordings listings screen 501 at its original transmission time (referred to as a "placeholder listing") a user would have had to navigate through multiple pages of Scheduled Recordings to find the postponed recording. If the user did not quickly find the postponed recordation listing, the user would have been left with uncertainty as to whether the interactive media guidance application intended to record the program at all. The inclusion of the placeholder listing with the Rain Check icon 508 resolves this uncertainty.

Figure 6:
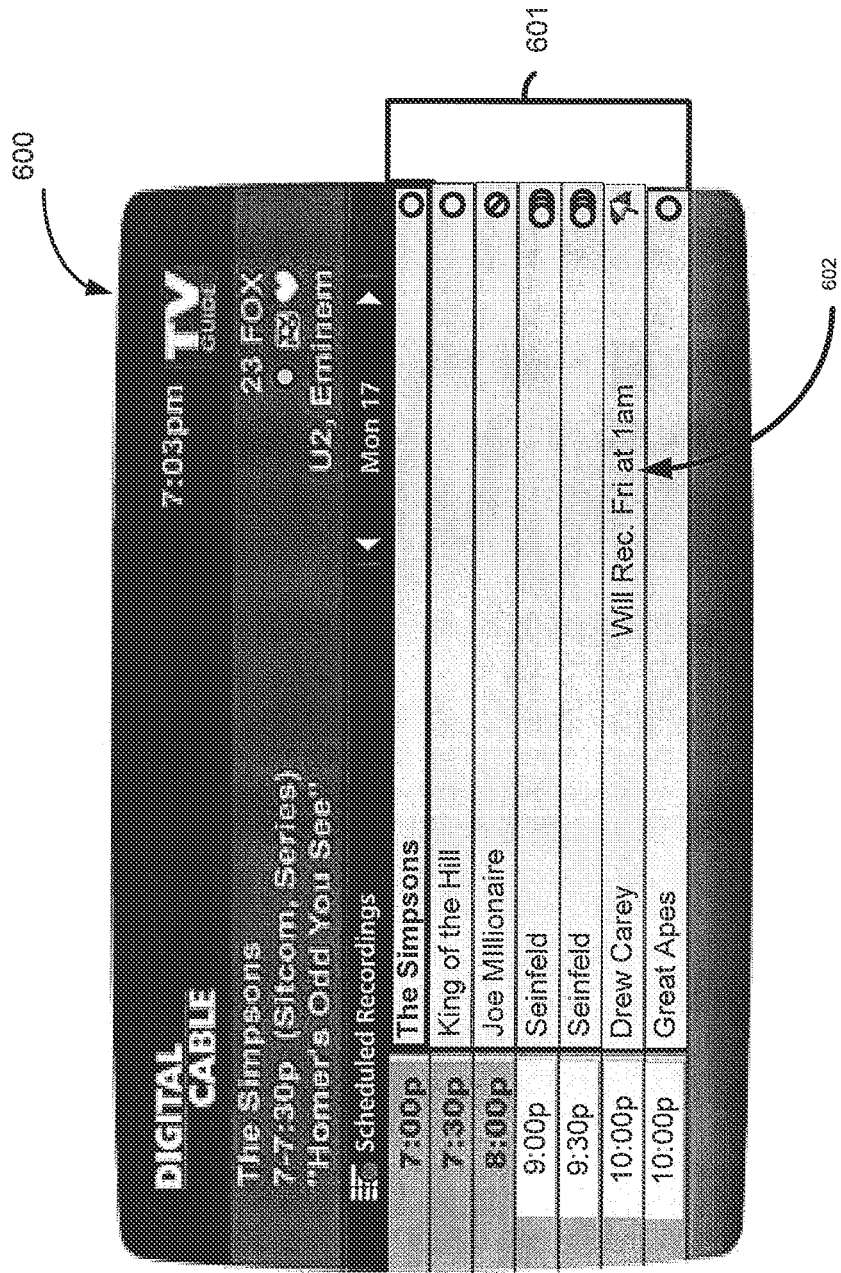

In the particular implementation of the Scheduled Recordings listings screen 501 of FIG. 5, the interactive media guidance application does not list the date and time at which the postponed program will be recorded. The user can obtain this information by navigating to the program in question and pressing an "information" key, an "ok" key, or a "select" key on the input device 114 or other suitable means. In contrast, in another implementation of the Scheduled Recordings listings screen 601, depicted in the screen 600 of FIG. 6, the future recording time 602 is displayed directly beside the postponed program.

In another embodiment, the interactive media guidance application displays a placeholder listing for a postponed program in the schedule recordings listings screen at its original time with a rain check icon 508, as well as listing the program at the time to which recording was postponed. The later time may be marked with a One-Time Recording icon similar to One-Time Recording icon 502, a Rain Check icon 508, or another icon specifically indicating that the recording is based on an earlier postponed recording request. For example, such an icon might include the Rain Check icon 508 with a check mark superimposed thereon. Similarly, in some embodiments, the original recording time may, but need not be, displayed alongside the postponed recording request.

The Scheduled Recordings listings screen 501 can be displayed in alternative formats without departing from the scope of the invention. For example, programs could be listed alphabetically instead of chronologically. Multiple columns of programs, corresponding to multiple days, may be displayed on the screen 500 at the same time. Alternatively, the Scheduled Recordings listings screen may be displayed in a Calendar format. In another implementation, users can sort or filter scheduled recordings by program category (e.g., series, movie, sporting event, or entertainment), by rating, or by genre (e.g., comedy, drama, horror, sci-fi, etc.).

Figure 7:
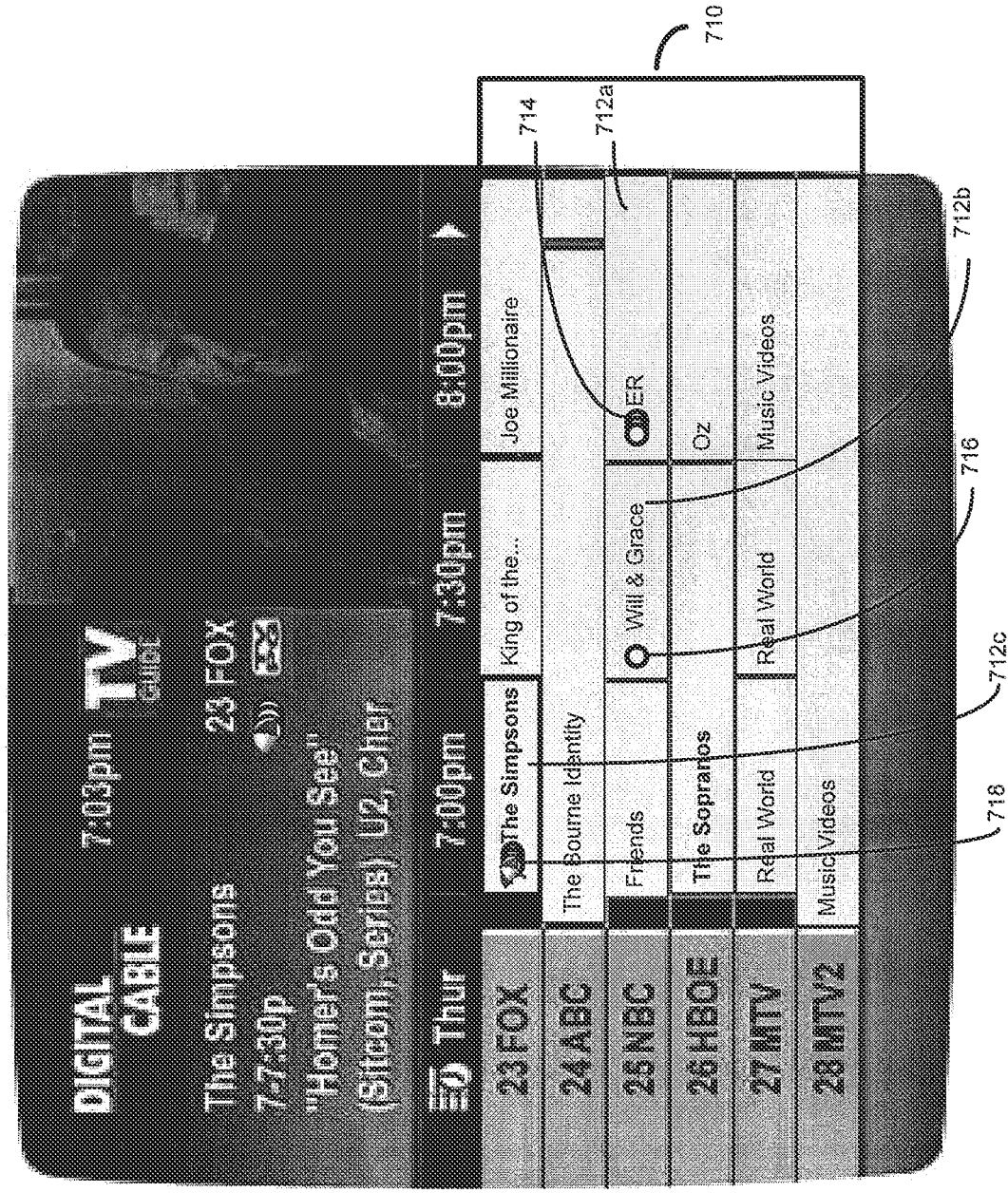
FIG. 7 shows an illustrative display screen showing a program grid including program recording status information in accordance with one embodiment of the present invention.

In one embodiment, information about scheduled recordings is displayed directly in the program grid. FIG. 7 is a screen 700 including an illustrative program grid 710 including scheduled recording information. As with program grid 210 of FIG. 2A, program grid 710 includes several cells (generally "cells 712") corresponding to programs airing at multiple times on multiple channels. The interactive media guidance application displays the recording status, if any, of each program with the program's corresponding cell 712. For example, "ER", displayed in cell 712a, is scheduled for recording as part of a series recording, as indicated by the Series Recording Icon 714. "Will & Grace" displayed in cell 712b is set to record as a one-time recording, as indicated by the One-Time Recording icon 716. "The Simpsons" is displayed in cell 712c. "The Simpsons" is marked with a Series Recording Rain Check icon 718. The Series Recording Rain Check icon 718 indicates that the interactive media guidance application will record the particular episode of the series at a later time.

In alternative embodiments of the program listings screens and program grids, recording status may be identified in additional ways. For example, cells in the program grid and rows in the Scheduled Recording Lists may be displayed in varying colors, with each color representing a particular recording status. Thus, the color can be used to distinguish one listing from another. Alternatively or in addition, the text within each cell or row may be displayed with a font color or font style that corresponds to the respective programs recording status. In some embodiments, a legend is displayed on screen to assist in interpreting the recording status of the various programs displayed.

When displaying the program grid 710, there is usually insufficient room within a given cell 712 to indicate the time at which a postponed recording will take place. Thus, if a user desires to obtain such information, the user may navigate a highlight to the cell 712 corresponding to the postponed program. The user may then select the program by pressing an "information" key, an "OK" key, a "select" key, or other suitable key or combination of keys on the input device 114. In response, the interactive media guidance application displays an information screen similar to that depicted in FIG. 3.

Figure 8:
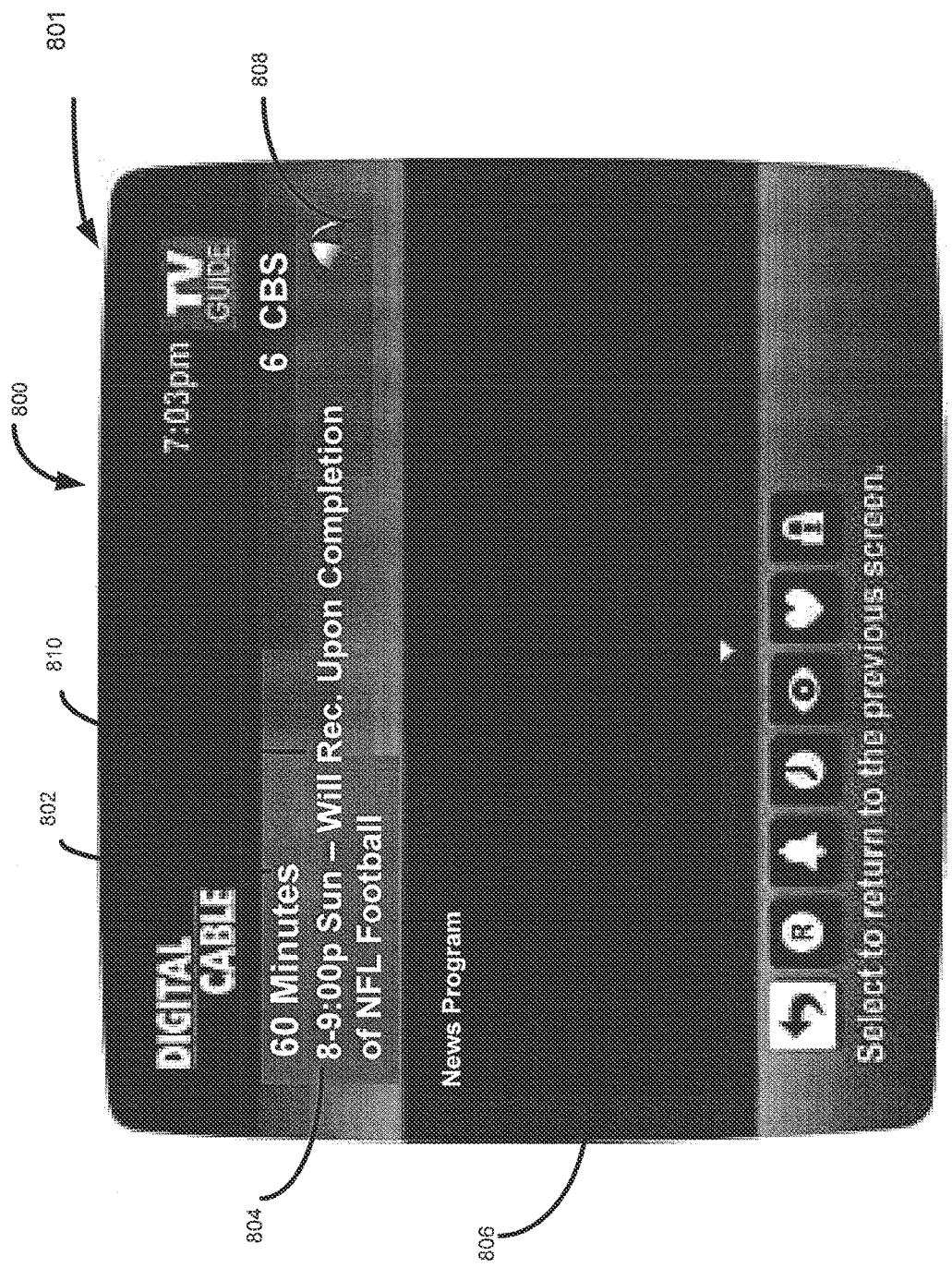
FIG. 8 shows a second illustrative display screen showing information relating to a television program including postponed recording information in accordance with one embodiment of the present invention.

FIG. 8 depicts a screen 800 including information section 801 displaying postponed recording information. The information section 801 displays the title of the show 802, its original transmission time 804, a description of the program 806, its recording status 808, as well as rescheduling information 810. In contrast to rescheduling information displayed in FIGS. 4 and 6, the rescheduling information 810 in the illustrative information section 801 does not include a specific date or time. Instead, the rescheduling information 810 indicates that the program will be recorded after the conclusion of the preceding program, in this case, an NFL Football game. As described above, a data source 124 or the interactive media guidance application may execute a web service using the SOAP protocol or other suitable process for keeping the interactive media guidance application apprised of real-time or near real-time changes in scheduling information. Such information allows the interactive media guidance application to learn when one program ends and another begins. Similar information can be used to postpone a recording of a sporting event based on real-time or near-real time information about delays caused by inclement weather or other events.

Users can select recorded programs for viewing from a Recorded Programs Listings screen provided by the interactive media guidance application. The user may access the listings screen by pressing a "Recorded Programs Menu" key or key sequence, navigating from one of the interactive media guidance application screens, or by any other suitable means. Recorded programs may be listed chronologically based on recording time or alphabetically based on title.

Postponing program recordation may result in confusion for a user attempting to find a program in the Recorded Programs Listings screen. Users tend to look for recorded programs in the Recorded Programs Listings screen at the original transmission time, when the user expects the program to be recorded. The potential for confusion is greatest when the program has not yet been recorded whereas, after recording, the program would at least appear in the Recorded Programs Listings screen, albeit in an unexpected location. If a recording scheduled to have been recorded does not appear at all, or appears at a later time than expected, the user may get concerned that the interactive media guidance application missed recording the program. Thus, in the Recorded Programs Listings screen of the present invention, this potential for confusion is mitigated using one or both of two features. The first feature is useful after the original transmission time of a program, but before a planned later recordation time. The second feature is useful both before and after the actual recordation of the program, when the Recorded Programs list is being viewed in a chronological order. These two features are described in the following paragraphs.

Figure 9:
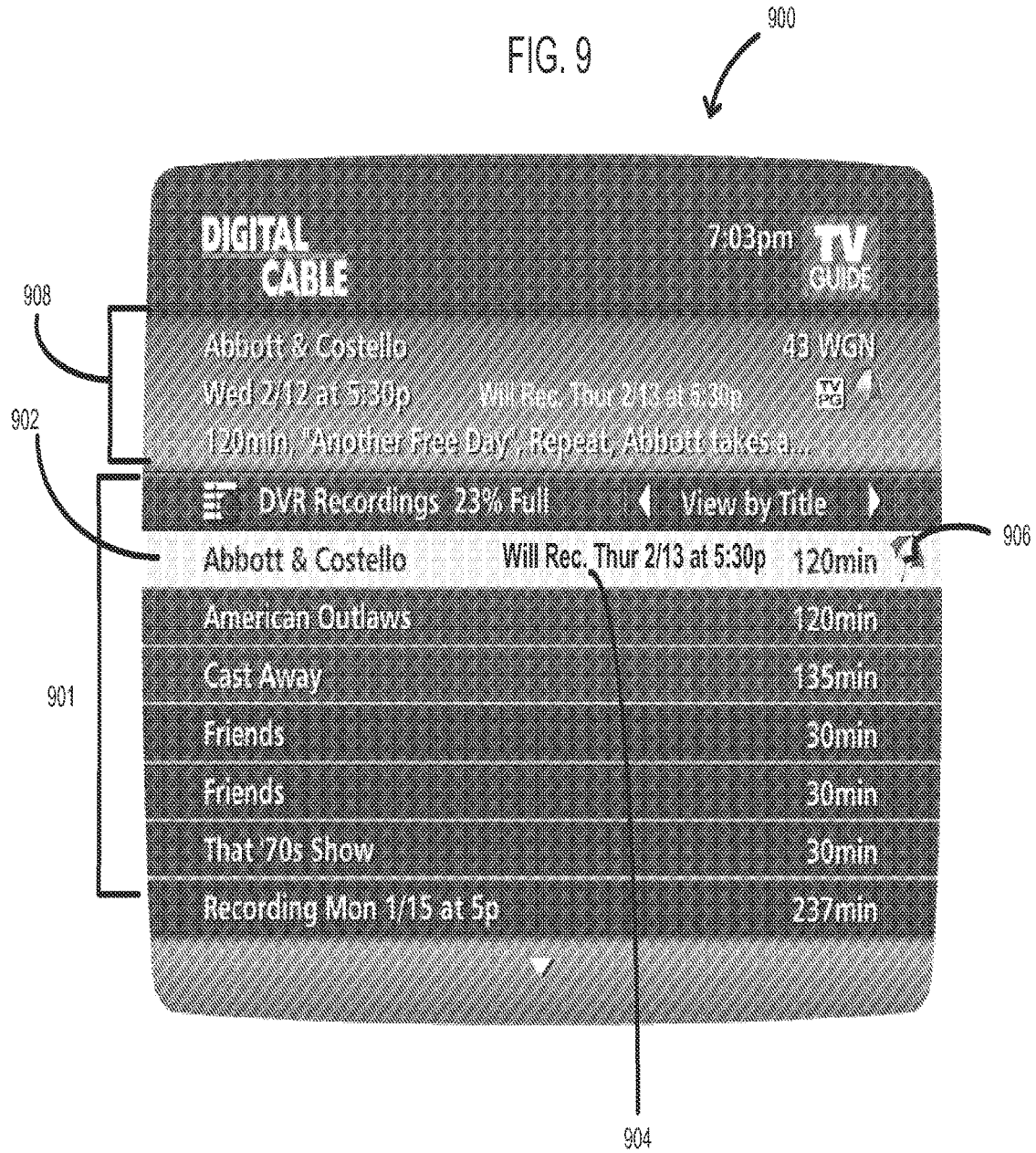
FIG. 9 shows an illustrative display screen showing a list of recorded programs in accordance with one embodiment of the present invention.

FIG. 9 depicts a Recorded Programs Listings screen 900 that incorporates the first of these confusion mitigation features. More particularly, Recording Programs Listings screen 900 includes a list of recordings 901 including placeholder listings, for example, placeholder listing 902. The placeholder listing 902 identifies a program that was initially intended to be recorded at a first transmission time, but that has not yet been recorded due to postponement. The placeholder listing 902 indicates the postponement via text 904 identifying the future recordation time and a rain check icon 906. In alternative implementations, a placeholder listing may only include or the other of the text 904 and the rain check icon 906. The rain check icon 906 and text 904 can also be displayed in an information window 908 displayed by the interactive media guidance application above the list of recorded programs 901.

According to the second confusion mitigation feature, when the interactive media guidance application displays a Recorded Programs Listings screen in chronological order, postponed recordings, or corresponding placeholder listings, are positioned in the Recorded Programs Listings screen based on their original transmission time. Thus, the postponed recording appears where the user is most likely to expect it.

To play back a recorded program, the user may select the listing corresponding to the program from a menu (e.g., the Recorded Programs Listings screen 900) and press a "play" key or key sequence, select a play option from an interactive media guidance application screen, or perform any other suitable step to initiate playback.

In other embodiments, the postponement and corresponding user indication features can be employed when recording multiple copies of programs. Systems and methods for managing the recording, selecting, and managing multiple copies of programs is described in U.S. patent application Ser. No. 11/241,523, filed Sep. 30, 2005, now issued as U.S. Pat. No. 7,646,962, entitled "Systems and Methods For Recording and Playing Back Programs Having Desirable Recording Attributes," which is incorporated herein by reference.

Figure 10:
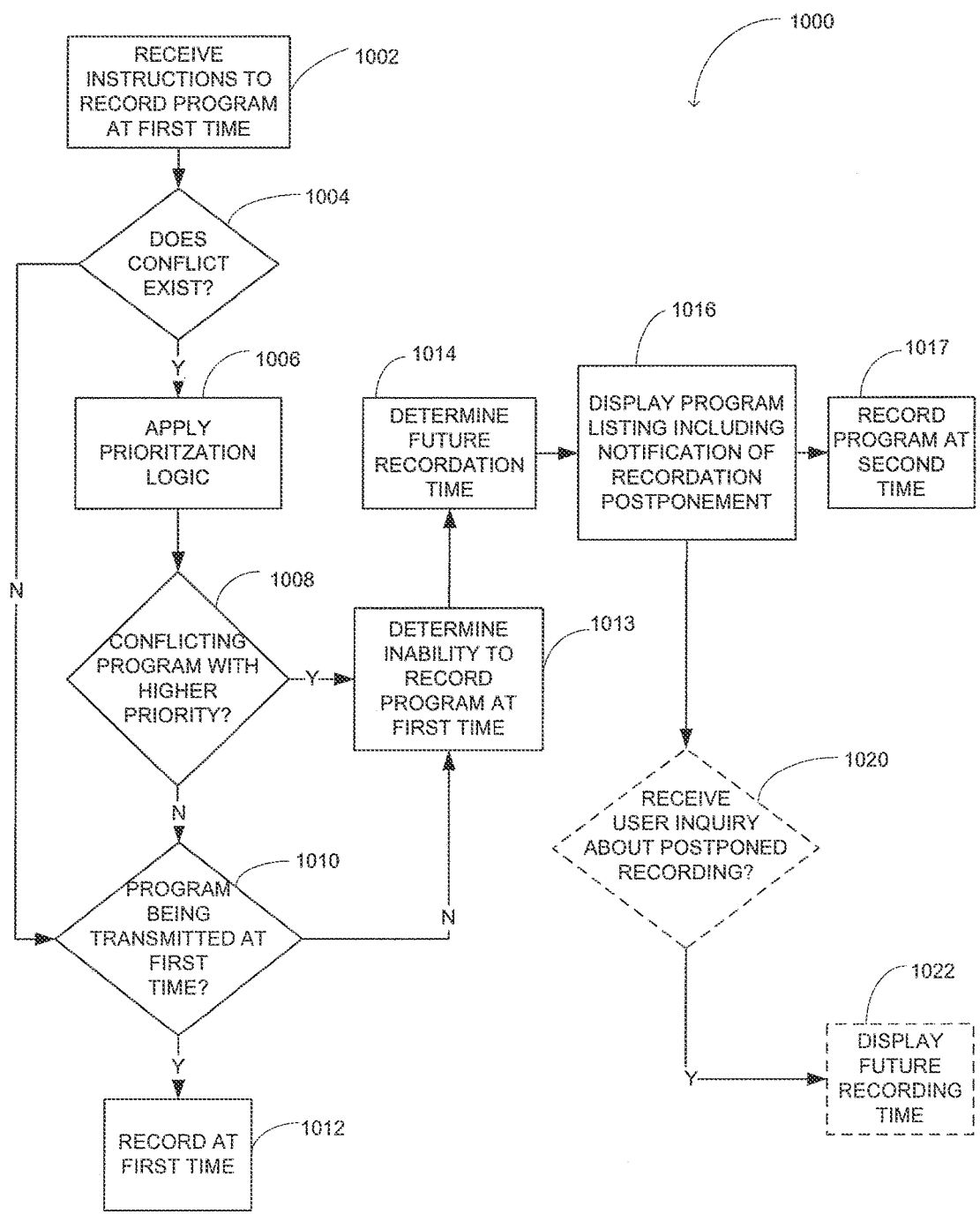
FIG. 10 shows a flow chart of an illustrative process for managing the recording of programs in accordance with one embodiment of the present invention.

FIG. 10 is a flow chart of a method 1000 for managing the recording of programs, according to an illustrative embodiment of the invention. The method 1000 is suitable for implementation, for example, by the user equipment 110 of FIG. 1.

The method begins with the interactive media guidance application executing at least in part on the user equipment 110 receiving instructions from a user to record a first program at a first time (step 1002). The interactive media guidance application determines, at decision block 1004, whether recording the first program conflicts with other programs scheduled to be recorded. The conflict check may be carried out immediately upon receiving the request and/or upon receipt of updated programming information.

If recording the first program at the first time poses a conflict (as determined at decision block 1004), the interactive media guidance application applies prioritization logic (step 1006) to determine which of the conflicting programs should be recorded at the first time. The interactive media guidance application may determine priorities among programs based on user input of relative priority, availability of future retransmissions of the conflicting programs, expected viewing time frames, or other parameters suitable for choosing among competing programs. Recording priority ties may be broken randomly or according to another suitable selection process.

If, in applying the prioritization logic (step 1006), the interactive media guidance application determines that the conflicting program is of lower priority (at decision block 1008), the interactive media guidance application plans to record the first program at the first time. At that first time, at decision block 1010, the interactive media guidance application determines whether the first program will still be transmitted on schedule. As described above, transmission of programs may be delayed for a variety of reasons including other programs going beyond their scheduled end times, events being delayed due to inclement weather, interruption by news events, etc.

If the first program is being transmitted at the first time, as scheduled, the interactive media guidance application records the first program at the first time (step 1012).

If the first program is delayed (at decision block 1010) or if the first program is determined to be of lower priority than the conflicting program (at decision block 1008), the interactive media guidance application determines that it is unable to record the first program at the first time (step 1013). Then the interactive media guidance application determines a future recordation time (step 1014). The future recordation time may be determined based on previously obtained scheduling data received from data sources 124 and/or real-time or near real-time data obtained about actual current or imminent program transmissions.

After a future recording time is determined (step 1014), in response to a user instructing the interactive media guidance application to display a program listing, for example, as part of a program grid screen, a program listings screen, a scheduled recordings listings screen, or a recorded program listings screen, the interactive media guidance application displays a notification indicating that the recording of the first program has been postponed (step 1016). Such notification can take the form of text, an icon, a color variation, or a combination thereof being displayed within a program grid cell or relative to a corresponding entry in the program list. At the future recordation time, the interactive media guidance application records the second program (step 1017).

In one embodiment, the notification displayed in step 1016 includes the future recordation time. In an alternative embodiment, the notification only indicates that recordation has been postponed without indicating the future recordation time. In this embodiment, two additional elements (illustrated in phantom) may be added to the method 1000. At decision block 1020, the interactive media guidance application determines whether a user inputs an inquiry with respect to the postponed recording. Such inquiry may take the form, for example, of the user navigating to the program on the program listings screen and pressing an "Information", "OK", or "Select" key. If the interactive media guidance application receives such an inquiry, the interactive media guidance application display information about the first program, including the future recordation time (1022).

Figure 11:
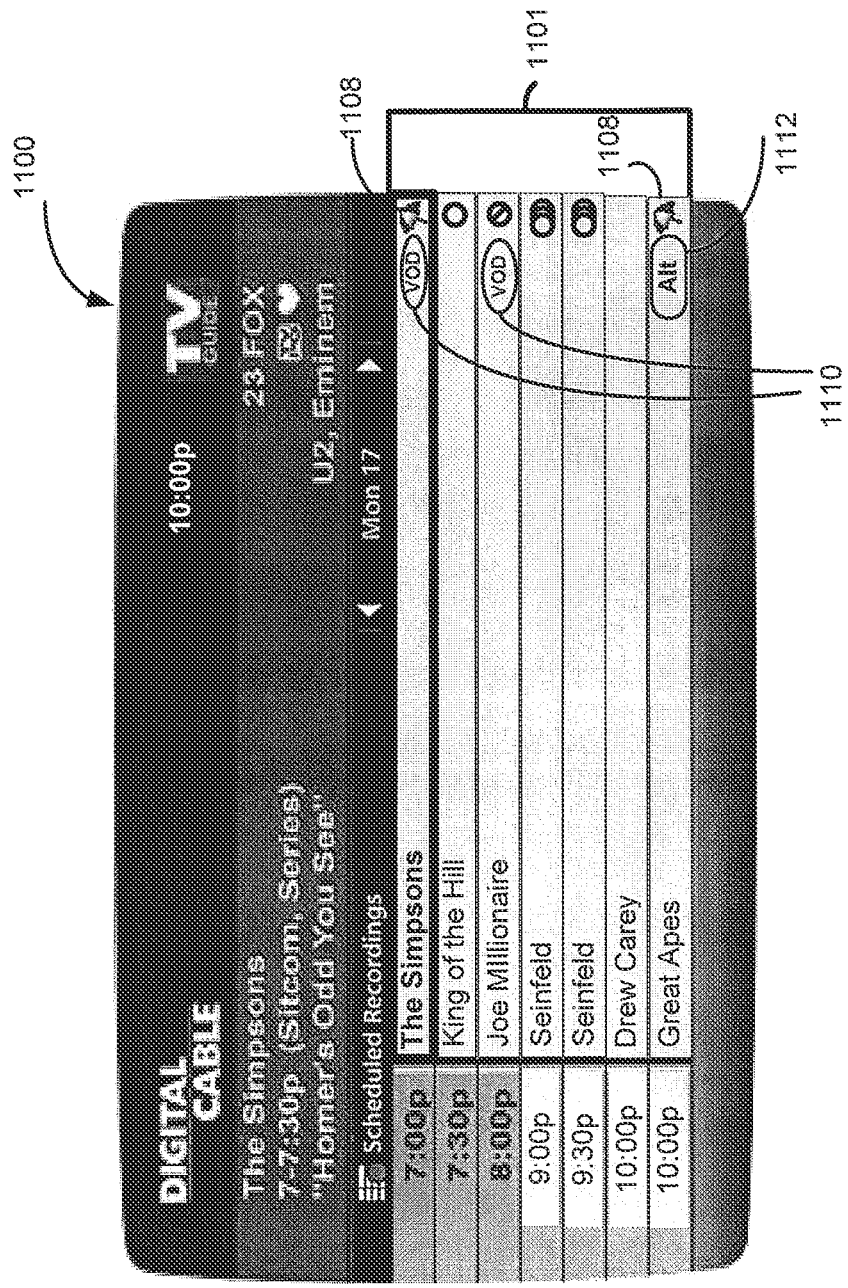
FIG. 11 shows an illustrative display screen showing a scheduled recordings listings screen including additional notification icons in accordance with one embodiment of the present invention.

FIG. 11 shows an illustrative display screen 1100 showing a scheduled recordings listings screen 1101 including additional notification icons 1110 and 1112 in accordance with one embodiment of the present invention. In comparison to the scheduled recordings programs listings screens 501 and 601 of FIGS. 5 and 6, respectively, scheduled recordings program listings screen 1101 identifies postponed programs (indicated by rain check icons 1108) which may be viewed via a video-on-demand server (indicated by VOD icons 1110) or for which alternative content is available (indicated by the ALT icon 1112). These alternative viewing opportunity indicator icons are particularly useful when a program recording is canceled due to an irreconcilable conflict (see, e.g., "Joe Millionaire"), or during the period beginning at a program's original recording time and ending at the postponed recording time. Based on the indicators, the user may take advantage of an alternative recorded program viewing opportunity or alternative viewing opportunities instead of waiting until the program is recorded at the later time.

Figure 12:
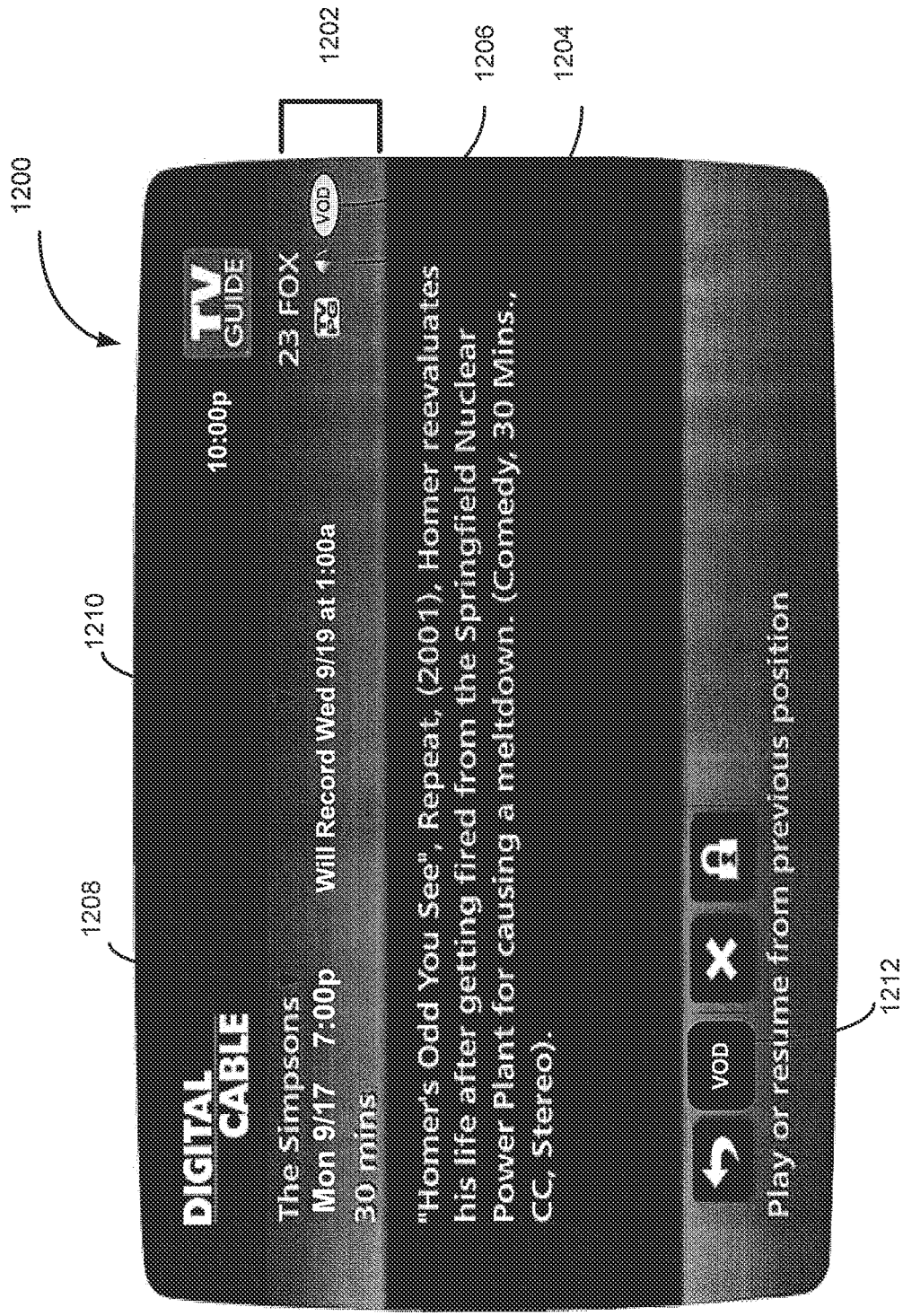
FIG. 12 shows an illustrative display screen showing a program identified for postponed recordation, which may also be viewed via a video-on-demand service in accordance with one embodiment of the present invention.

FIG. 12 shows an illustrative display screen 1200 showing a program, "The Simpsons", identified for postponed recordation. In the detailed information section 1202, the display screen includes two icons, a rain check icon 1204 and a VOD icon 1206, indicating alternative recorded programming viewing opportunities. The detailed information section 1202 also indicates the original recordation time 1208 and the postponed recordation time 1210. At the bottom of the display screen 1200, a user can select a VOD button 1212 to be linked directly to the video-on-demand version of the program.

Figure 13:
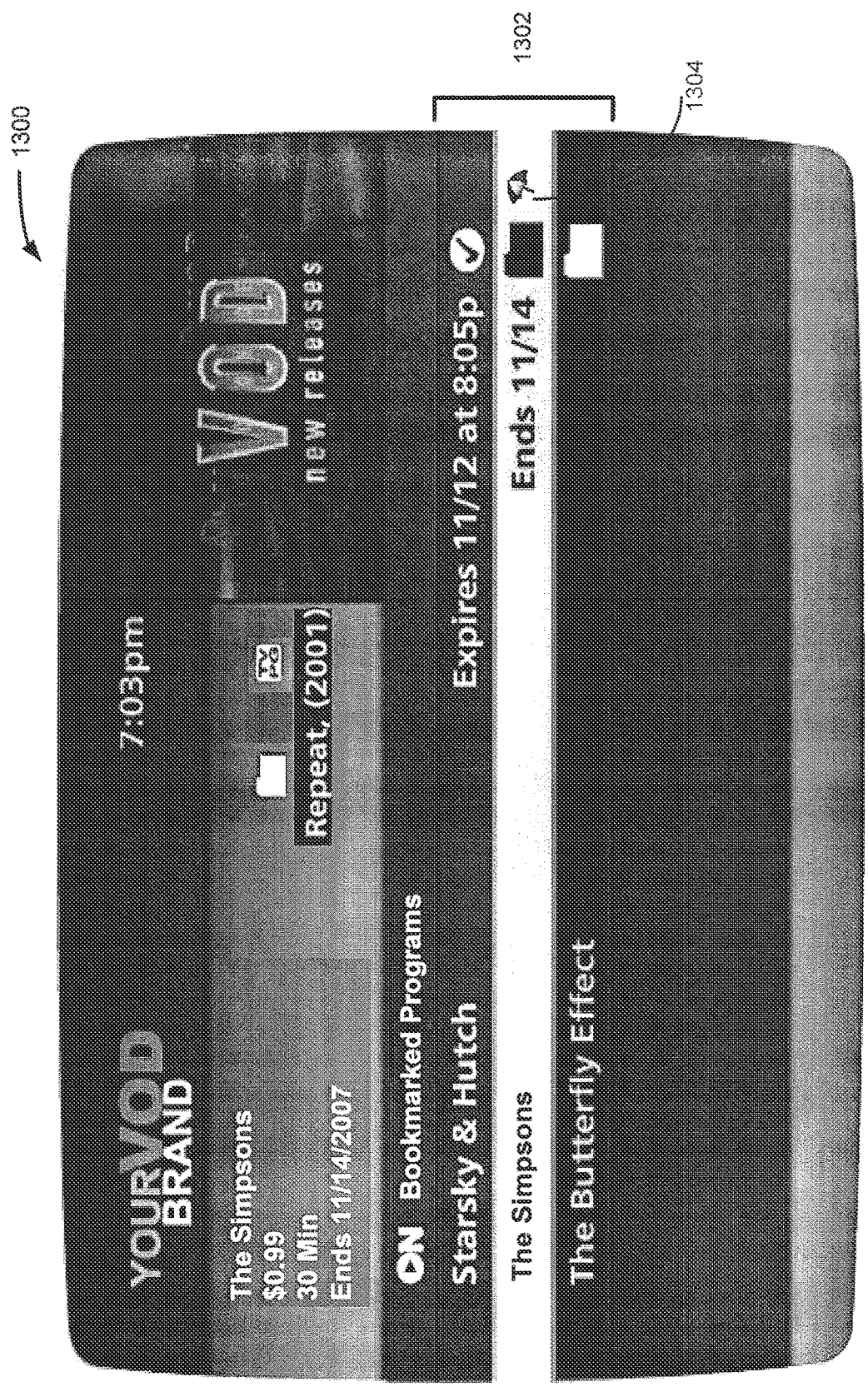
FIG. 13 shows an illustrative display screen including a program bookmarks listings screen in accordance with one embodiment of the present invention.

FIG. 13 shows an illustrative display screen 1300 including a program bookmarks listings screen 1302. The program bookmarks listings screen 1302 includes a list of certain programs available for viewing from the video-on-demand server. Users may add programs to the list manually as they browse the catalog of program offerings made available on the video-on-demand server. In addition, the interactive media guidance application, upon postponing the recordation of a program requested by a user, may automatically search for such program in the video-on-demand catalog to identify a recorded programming viewing alternative for the user. If the program is identified, the interactive media guidance application adds the program to the program bookmarks listings screen 1302. The added program is displayed with a rain check icon 1304 to notify a user that the program was bookmarked in response to postponing the recordation of the program at an earlier time. In alternative embodiments, the bookmarked programs listings screen may be combined with a saved programs listings screen that includes on-demand programming the user has already begun watching.

Figure 14:
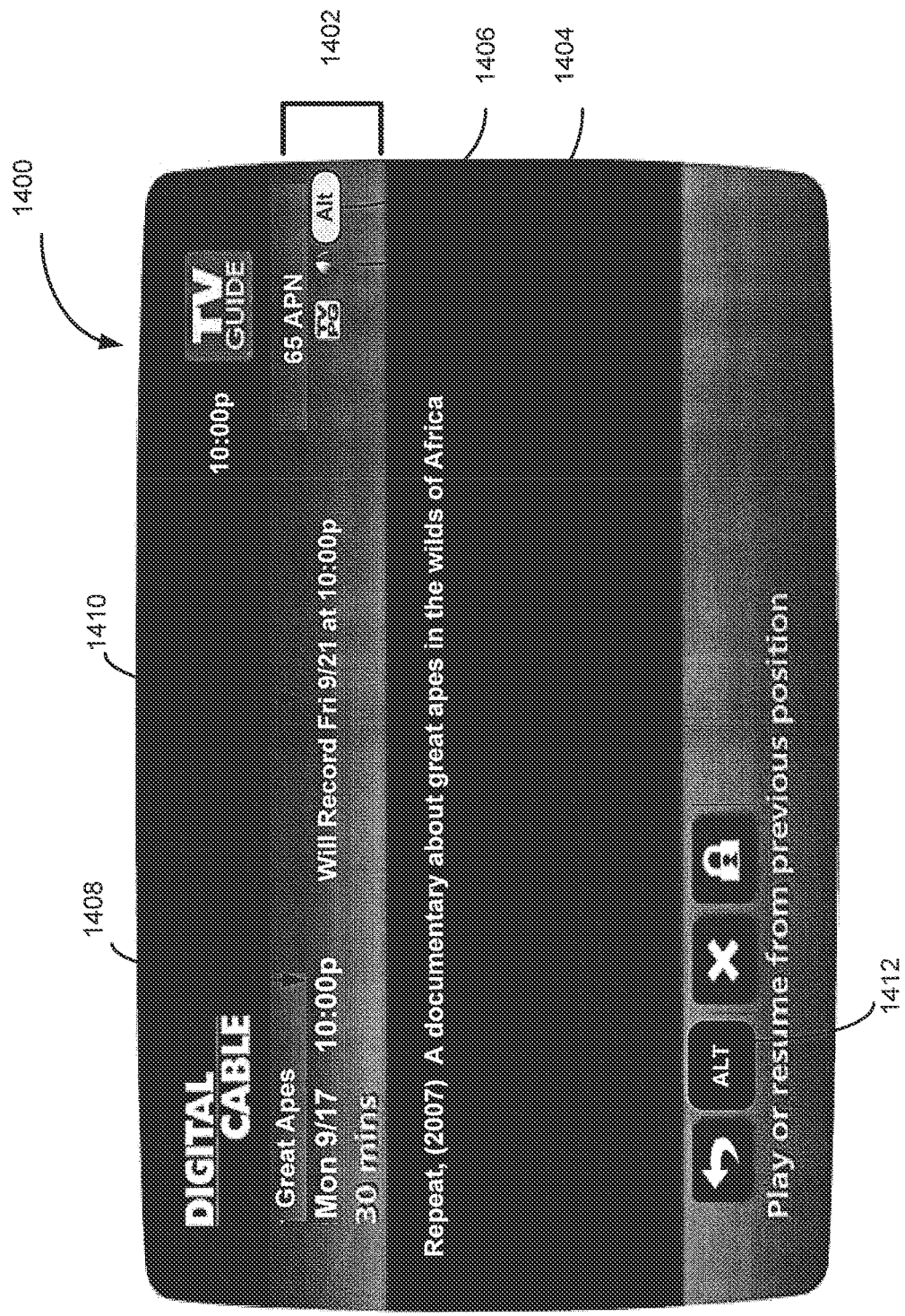
FIG. 14 shows an illustrative display screen showing a program identified for postponed recordation for which alternative content has been identified in accordance with one embodiment of the present invention.

FIG. 14 shows an illustrative display screen 1400 showing a program, "Great Apes", identified for postponed recordation. In the detailed information section 1402, the display screen includes two icons, a rain check icon 1404 and a ALT icon 1406, indicating an alternative recorded programming viewing opportunity, and an alternative to view alternative related content. The detailed information section 1402 also indicates the original recordation time 1408 and the postponed recordation time 1410. At the bottom of the display screen 1400, a user can select an ALT button 1212 to obtain a list of alternative programs and corresponding transmission times having content identified by the interactive media guidance application as being of similar subject matter. The listing may also include links to content available via a video-on-demand server.

The above described embodiments of the present invention are presented for purposes of illustration and not of limitation, and the present invention is limited only by the claims which follow.

What is claimed is:

1. A method for scheduling a recording using a media guidance application, the method comprising:
  receiving, with control circuitry, scheduling information associated with a plurality of media listings;
  receiving, with the control circuitry, a user request from a user to schedule a media asset for recording at a first time that is based on the scheduling information;
  after receiving the user request to schedule the media asset for recording, receiving, with the control circuitry, updated scheduling information associated with the plurality of media asset listings;
  in response to receiving the updated scheduling information, determining, using the control circuitry, based on the updated scheduling information, that the media asset scheduled to be recorded at the first time is no longer scheduled to be transmitted at the first time and will no longer be recorded, and automatically computing, with the control circuitry, a time frame based on a viewing history of the user, wherein the viewing history indicates a time period within which the user is likely to view the media asset;
  searching the updated scheduling information associated with the media asset listings with the control circuitry to determine whether the media asset will be available for recording at a time other than the first time but within the time frame; and
  based on determining that the media asset is available for recording at a second time within the time frame, automatically scheduling, with the control circuitry, a recording of the media asset at the second time.

2. The method of claim 1, further comprising:
  determining that a second media asset scheduled to be recorded at a third time will no longer be recorded because a third media asset has been scheduled to be recorded at the third time;
  automatically computing, with the control circuitry, a second time frame based on the viewing history of the user, wherein the viewing history further indicates a time period within which the user is likely to view the second media asset;
  searching, with the control circuitry, the updated scheduling information associated with the media asset listings to determine whether the second media asset will be available for recording at a time other than the third time but within the second time frame; and
  based on determining that the second media asset is available for recording at a fourth time within the second time frame, scheduling, with the control circuitry, a recording of the second media asset at the fourth time.

3. The method of claim 2, further comprising:
  assigning a first priority to the second media asset and a second priority to the third media asset, wherein the determination that the second media asset scheduled to be recorded at the third time will no longer be recorded is based on determining that the first priority is lower than the second priority.

4. The method of claim 3, wherein the first priority and the second priority are assigned based on user input.

5. The method of claim 1, further comprising generating for display a scheduled recording screen that includes an indication that an alternative media asset recording opportunity for the media asset has been found at the second time.

6. The method of claim 5, wherein the scheduled recording screen includes an indication of a recording status of the media asset.

7. A system for scheduling a recording using a media guidance application, the system comprising:
  control circuitry configured to:
    receive scheduling information associated with a plurality of media listings; receive a user request from a user to schedule a media asset for recording at a first time that is based on the scheduling information;
    receive updated scheduling information associated with the plurality of media asset listings;
    in response to receiving the updated scheduling information, determine that the media asset scheduled to be recorded at the first time is no longer scheduled to be transmitted at the first time and will no longer be recorded, and automatically compute a time frame based on a viewing history of the user, wherein the viewing history indicates a time period within which the user is likely to view the media asset:
    search the updated scheduling information associated with the media asset listings to determine whether the media asset is available for recording at a time other than the first time but within the time frame; and based on determining that the media asset is available for recording at a second time within the time frame, automatically schedule a recording of the media asset at the second time.

8. The system of claim 7, wherein the control circuitry is further configured to:
- determine that a second media asset scheduled to be recorded at a third time will no longer be recorded because a third media asset has been scheduled to be recorded at the third time;
- automatically compute a second time frame based on the viewing history of the user, wherein the viewing history further indicates a time period within which the user is likely to view the second media asset;
- search the updated scheduling information associated with the media asset listings to determine whether the second media asset will be available for recording at a time other than the third time but within the second time frame; and
- based on determining that the second media asset is available for recording at a fourth time within the second time frame, schedule a recording of the second media asset at the fourth time.

9. The system of claim 8, wherein the control circuitry is further configured to:
- assign a first priority to the second media asset and a second priority to the third media asset, wherein the determination that the second media asset scheduled to be recorded at the third time will no longer be recorded is based on determining that the first priority is lower than the second priority.

10. The system of claim 9, wherein the first priority and the second priority are assigned based on user input.

11. The system of claim 7, wherein the control circuitry is further configured to generate for display a scheduled recording screen that includes an indication that an alternative media asset recording opportunity for the media asset has been found at the second time.

12. The system of claim 11, wherein the scheduled recording screen includes an indication of a recording status of the media asset.

* * * * *